US012801457B2

(12) United States Patent
Gracia-Tinedo et al.

(10) Patent No.: US 12,801,457 B2
(45) Date of Patent: Nov. 17, 2026

(54) METHOD AND SYSTEM FOR LEVERAGING STORAGE-COMPUTE AUTO-SCALING FOR DATA STREAM PROCESSING PIPELINES

(71) Applicant: Dell Products L.P., Round Rock, TX (US)

(72) Inventors: Raúl Gracia-Tinedo, Barcelona (ES); Yumin Zhou, Shanghai (CN); Yi Liu, Shanghai (CN); Yimin Xiong, Shanghai (CN); Flavio Paiva Junqueira, Barcelona (ES)

(73) Assignee: Dell Products L.P., Round Rock, TX (US)

( * ) Notice: Subject to any disclaimer, the term of this patent is extended or adjusted under 35 U.S.C. 154(b) by 417 days.

(21) Appl. No.: 18/418,710

(22) Filed: Jan. 22, 2024

(65) Prior Publication Data

US 2025/0238285 A1 Jul. 24, 2025

(51) Int. Cl.
*G06F 9/50* (2006.01)
*G06F 9/48* (2006.01)
*G06F 9/52* (2006.01)

(52) U.S. Cl.
CPC .......... *G06F 9/5083* (2013.01); *G06F 9/4881* (2013.01); *G06F 9/52* (2013.01)

(58) Field of Classification Search
CPC ........ G06F 9/50; G06F 9/5083; G06F 9/5061; G06F 9/4881; G06F 16/24568
USPC .................................................. 718/107, 104
See application file for complete search history.

(56) References Cited

U.S. PATENT DOCUMENTS 9,372,735 B2 * 6/2016 Calder .................. G06F 9/5077
10,097,595 B2 * 10/2018 Shi ...................... H04L 65/4015
11,574,243 B1 * 2/2023 Mallya Kasaragod ...................... G06F 9/5044
12,032,855 B2 * 7/2024 Mitkar .................. G06F 3/0659
(Continued)

OTHER PUBLICATIONS

Raúl Gracia-Tinedo, Flavio Junqueira, Brian Zhou, Yimin Xiong, and Luis Liu, "Practical Storage-Compute Elasticity for Stream Data Processing". In Proceedings of the 24th International Middleware Conference: Industrial Track (Middleware '23). Association for Computing Machinery, New York, NY, USA, pp. 1-7, <https://dl.acm.org/doi/abs/10.1145/3626562.3626828>, Dec. 2023.
(Continued)

*Primary Examiner* — Jacob D Dascomb
(74) *Attorney, Agent, or Firm* — Chamberlain, Hrdlicka, White, Williams & Aughtry; Aly Z. Dossa

(57) ABSTRACT

A method for managing a data stream processing pipeline includes: monitoring, by an orchestrator, data stream ingestion of a streaming storage system (SSS) to obtain data stream metrics; analyzing, by the orchestrator, the data stream metrics based on a user-defined scaling policy; making, based on the analyzing and by the orchestrator, a first determination that task manager scaling is required; making, by the orchestrator, a second determination that the data stream ingestion is increased, in which the second determination indicates an increase in a number of parallel stream segments associated with a data stream, in which a segment store hosted by the SSS manages the parallel stream segments; and to increase a stream processing system's compute capability and by the orchestrator, initiating scaling of a number of the plurality of task managers to support the increase in the number of the parallel stream segments.

9 Claims, 13 Drawing Sheets

(56) References Cited

U.S. PATENT DOCUMENTS

| | | | | |
|---|---|---|---|---|
| 2016/0321588 | A1* | 11/2016 | Das | G06F 11/3452 |
| 2018/0332367 | A1* | 11/2018 | Kaitchuck | H04L 67/568 |
| 2022/0075664 | A1* | 3/2022 | Fawcett | G06F 18/214 |
| 2026/0111272 | A1* | 4/2026 | Gracia-Tinedo | G06F 9/5027 |

OTHER PUBLICATIONS

Raúl Gracia-Tinedo, Flavio Junqueira, Tom Kaitchuck, and Sachin Joshi, Pravega: A Tiered Storage System for Data Streams:, In Proceedings of the 24th International Middleware Conference (Middleware '23). Association for Computing Machinery, New York, NY, USA, pp. 165-177, < https://dl.acm.org/doi/abs/10.1145/3590140.3629113>, Dec. 2023.

* cited by examiner

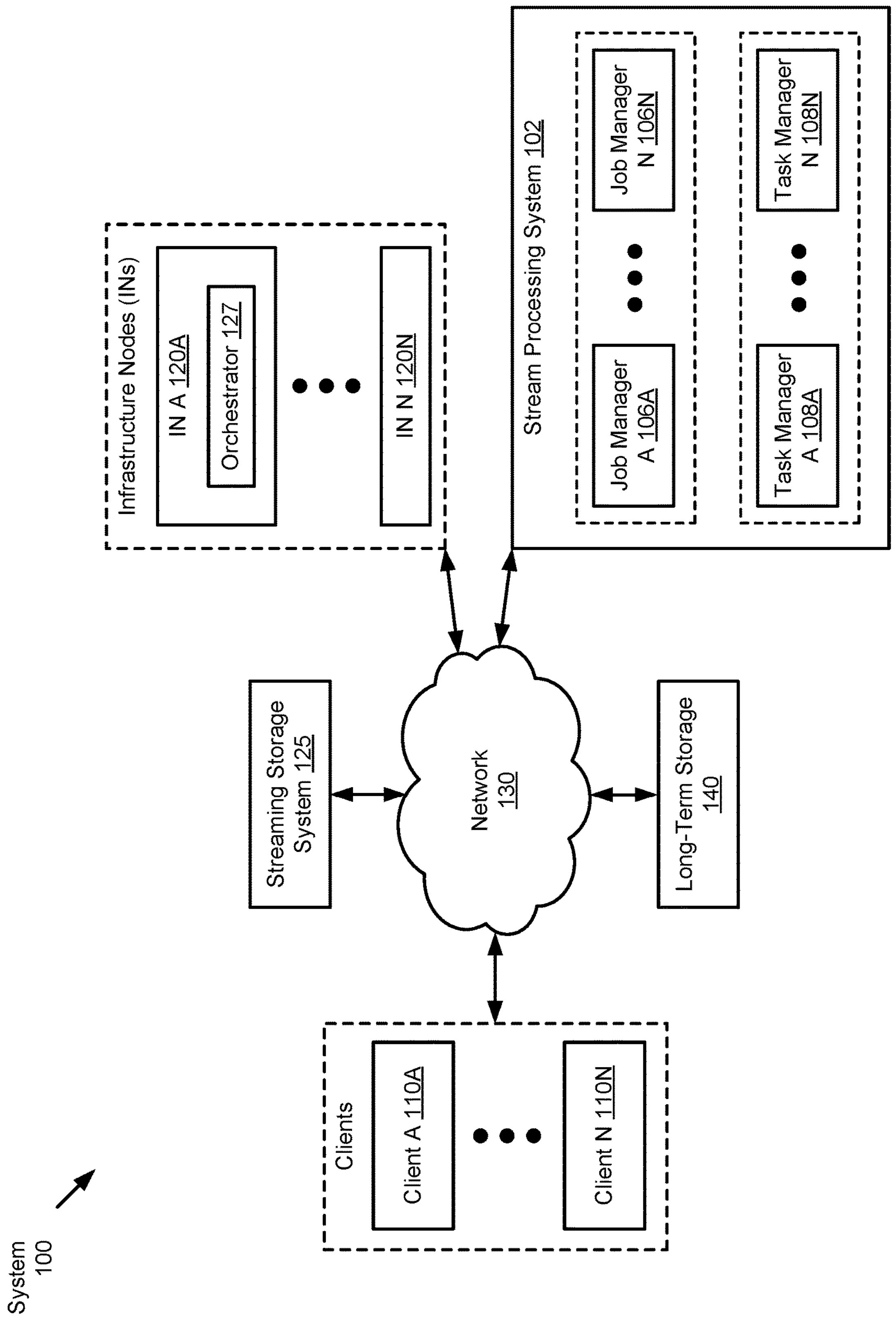
FIG. 1.1

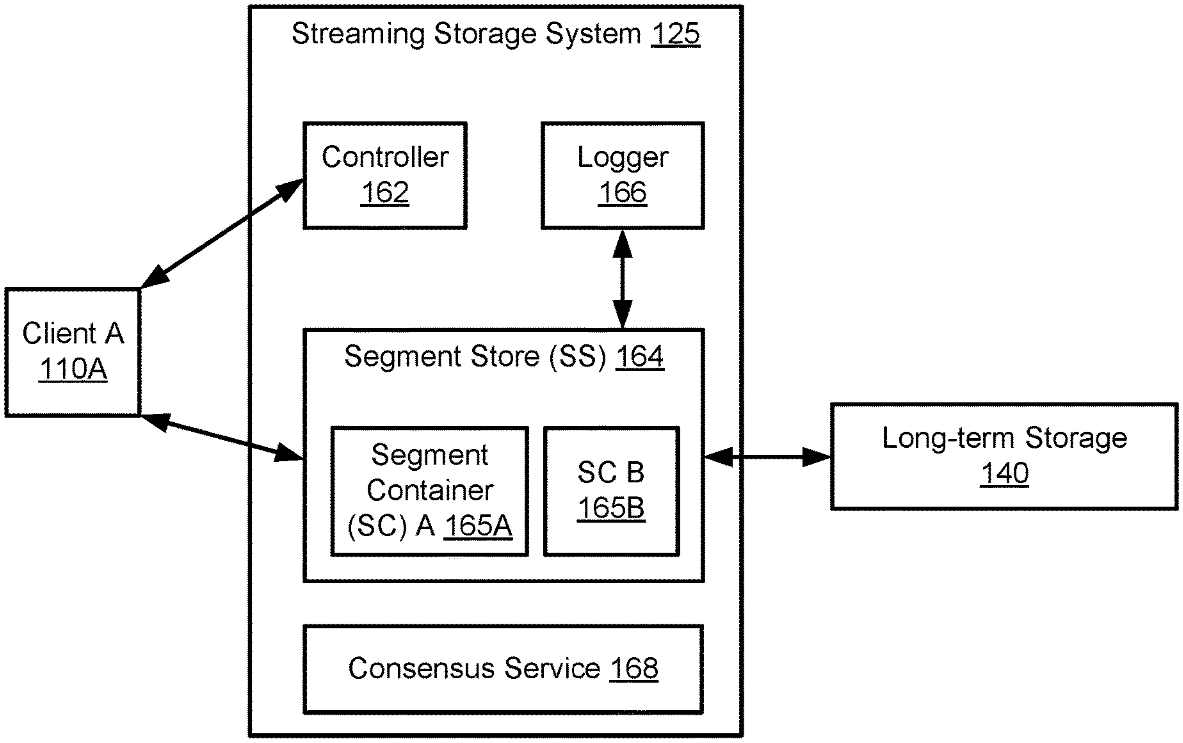
FIG. 1.2

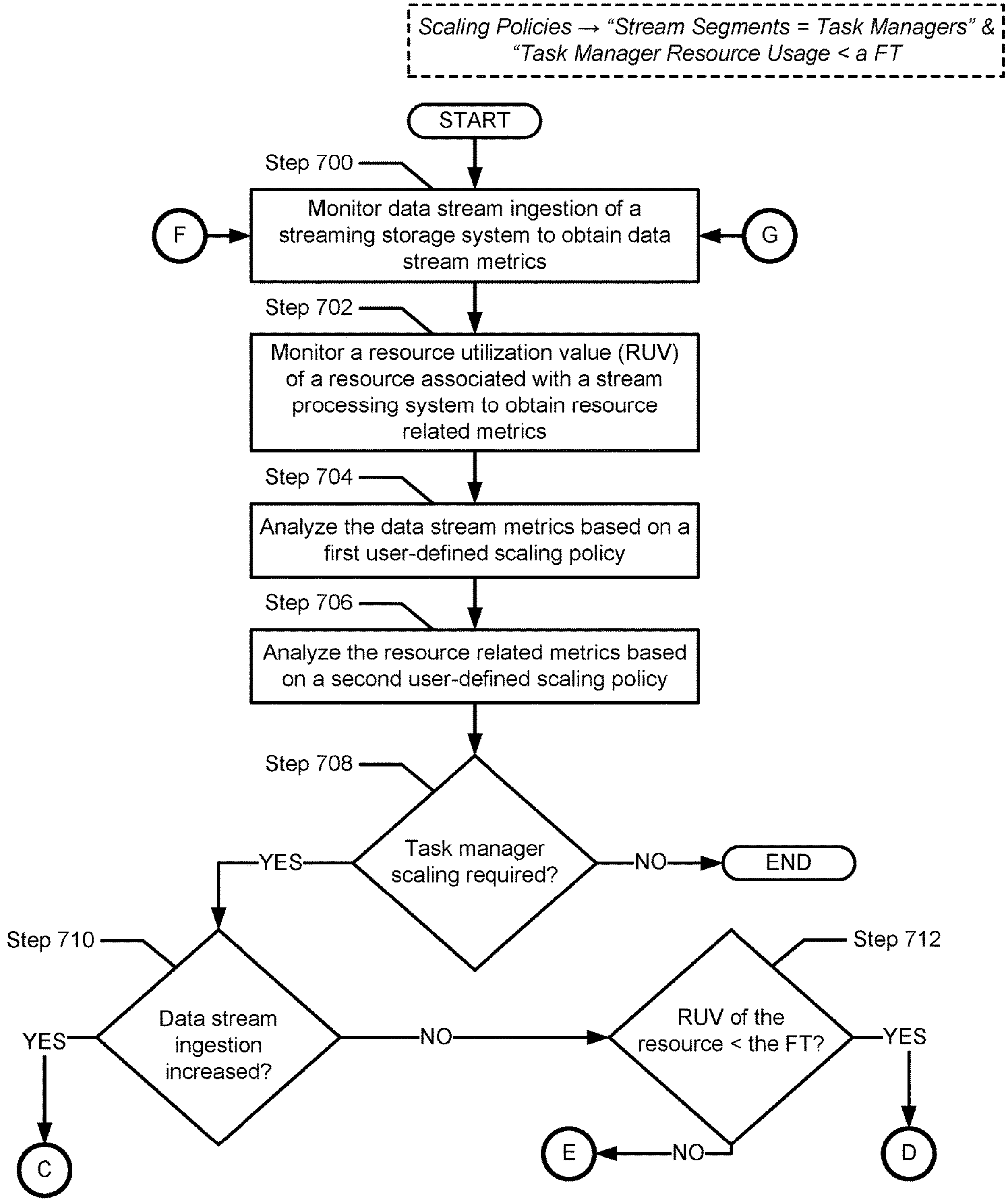
FIG. 7.1

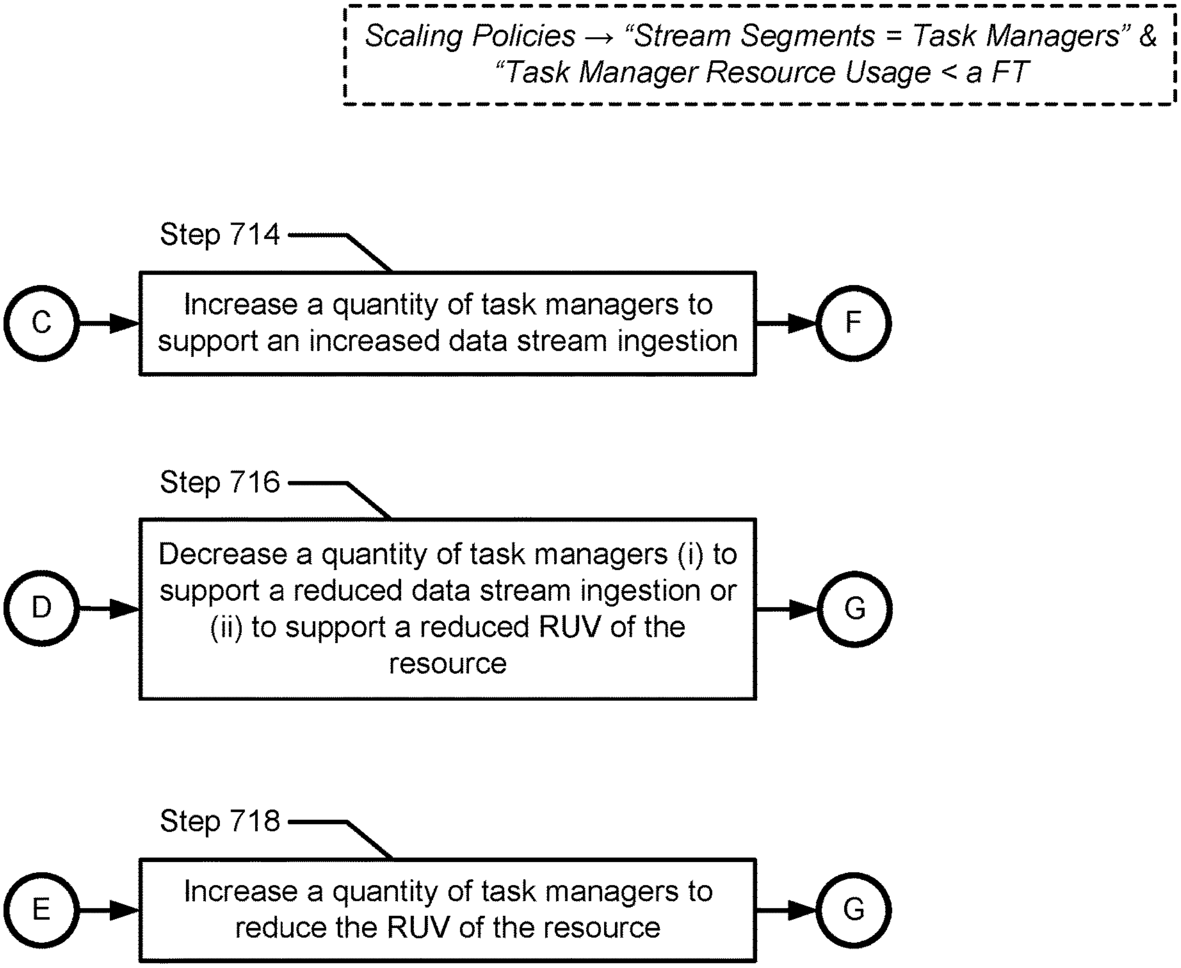
FIG. 7.2

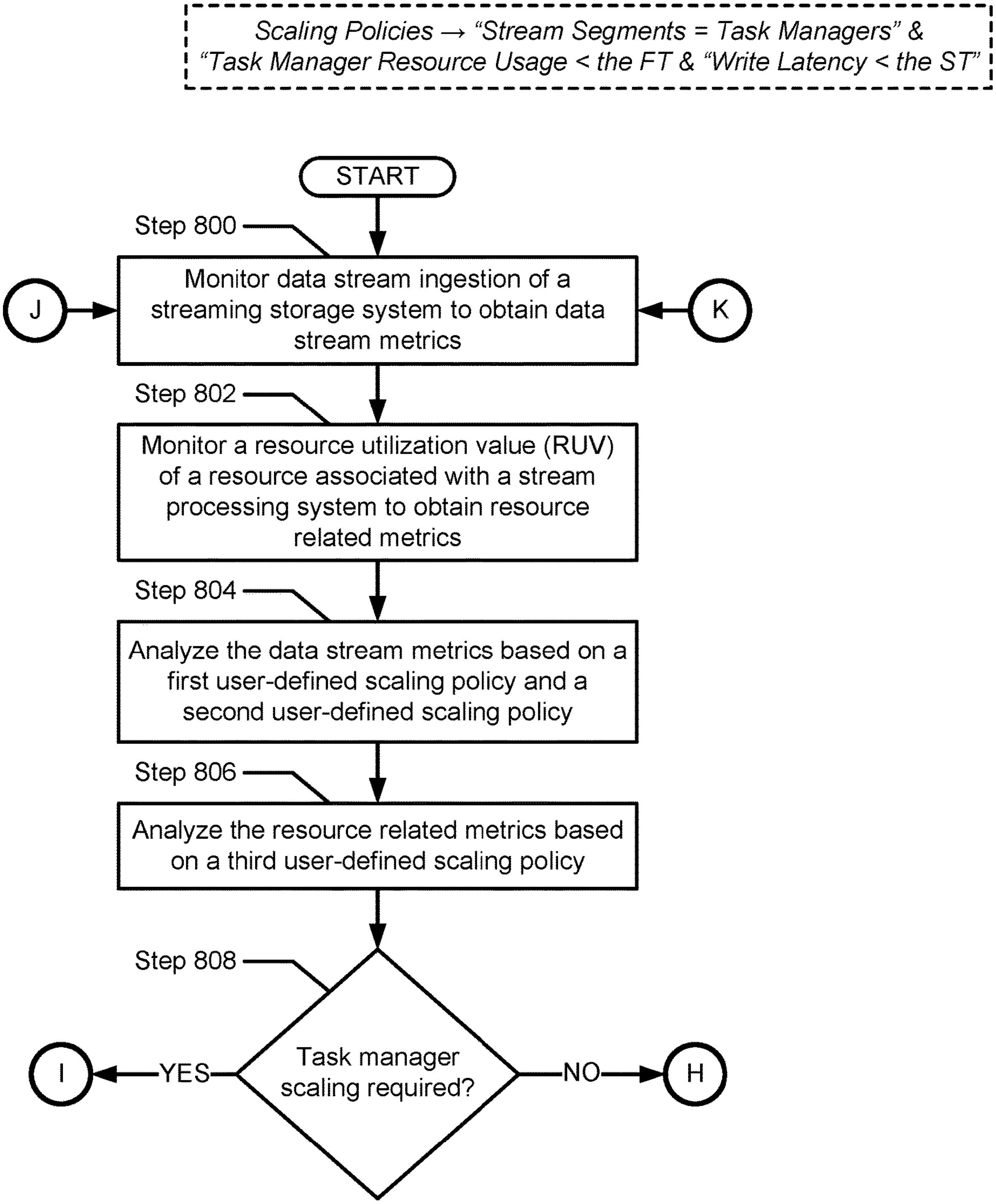
FIG. 8.1

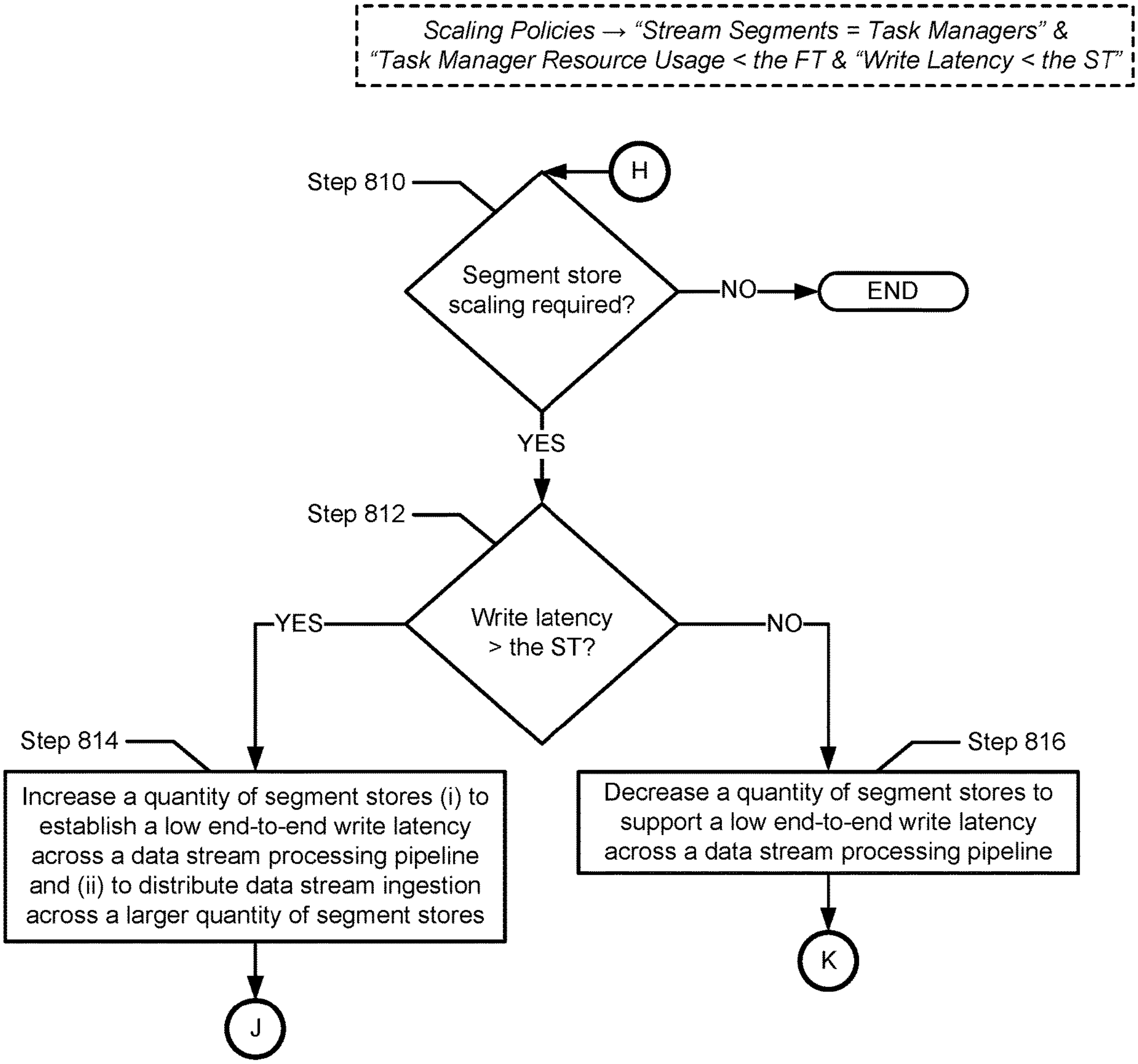
FIG. 8.2

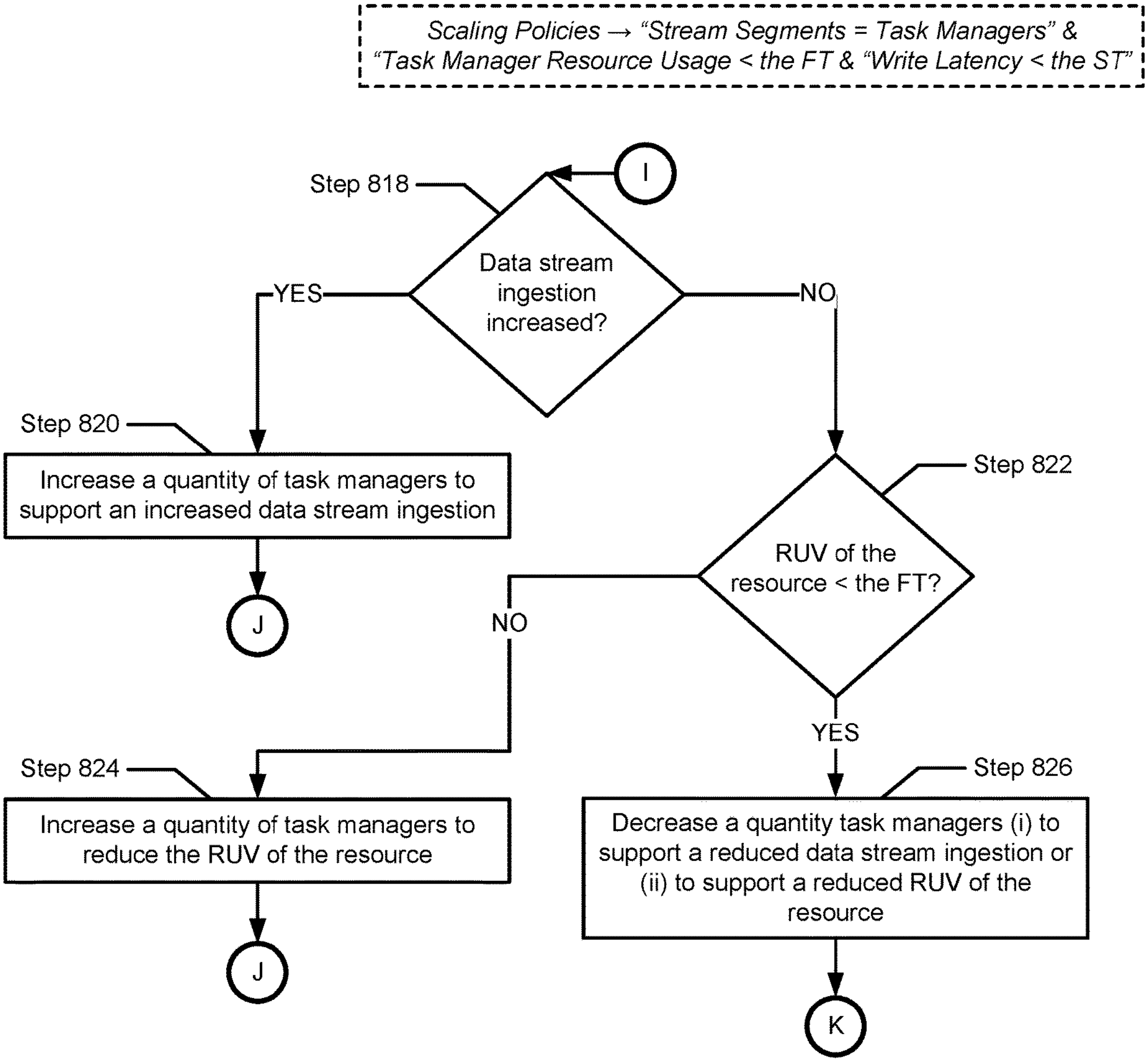
FIG. 8.3

METHOD AND SYSTEM FOR LEVERAGING STORAGE-COMPUTE AUTO-SCALING FOR DATA STREAM PROCESSING PIPELINES

BACKGROUND

Streaming applications are applications that deal with a large amount of data arriving continuously. In processing streaming application data, the data can arrive late, arrive out of order, and the processing can undergo failure conditions. It may be appreciated that tools designed for previous generations of big data applications may not be ideally suited to process and store streaming application data.

BRIEF DESCRIPTION OF DRAWINGS

Certain embodiments of the invention will be described with reference to the accompanying drawings. However, the accompanying drawings illustrate only certain aspects or implementations of the invention by way of example, and are not meant to limit the scope of the claims.

FIG. 1.1 shows a diagram of a system in accordance with one or more embodiments of the invention.

FIG. 1.2 shows a diagram of a streaming storage system in accordance with one or more embodiments of the invention.

FIGS. 7.1 and 7.2 show a method for managing a data stream processing pipeline in accordance with one or more embodiments of the invention.

FIGS. 8.1-8.3 show a method for managing a data stream processing pipeline in accordance with one or more embodiments of the invention.

DETAILED DESCRIPTION

Figure 2:
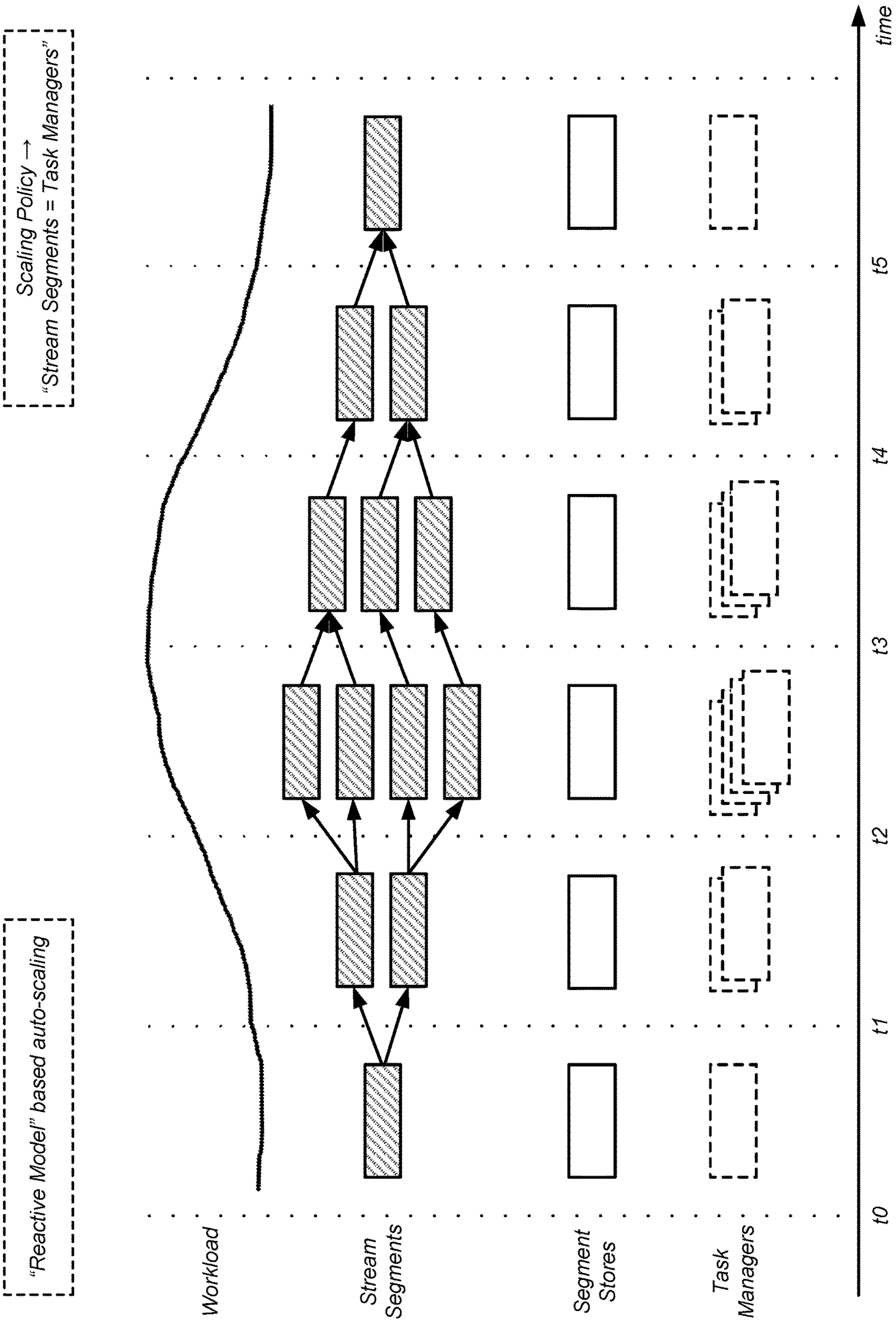
FIG. 2 shows an example reactive model-based auto-scaling of task managers in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of one or more embodiments of the invention. However, it will be apparent to one of ordinary skill in the art that the one or more embodiments of the invention may be practiced without these specific details. In other instances, well-known features have not been described in detail to avoid unnecessarily complicating the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, streaming data applications process data from sources (e.g., social media networks, online retailer applications, streaming services, financial data applications, Internet of Things (IoT) devices, etc.) that may independently generate data/events at different times. Streaming data applications typically utilize storage systems (e.g., streaming storage systems such as Pravega, an open-source streaming storage engine, Apache Kafka, Apache Pulsar, etc.) because data representing events in a system may be received and stored independent of reading or processing of the data, and further may be written by different writers of the system at different writing rates, as well as read by different readers at different reading rates.

In recent years, streaming storage systems are becoming increasingly popular for managing and storing data events (or data streams) in different scenarios. These systems allow users to write small events with low-latency and read events both in real-time (e.g., on the order of milliseconds (ms) or less) and in batch for processing (e.g., data stream processing pipelines). In some cases, data stream processing pipelines need to handle workload fluctuations (e.g., daily patterns of regular item purchases, unusually high amount of activity in data ingestion because of a recently launched mobile device, etc.) by scaling up/down the resources contributed to performing related processes/jobs. While there have been efforts proposing auto-scaling mechanisms for stream processing engines/modules/operators/systems (e.g., Apache Flink), conventional approaches have overlooked the role of a storage system that ingests and serves one or more data stream (or stream data). This is problematic because the number of parallel partitions of a data stream limits not only a data stream processing pipeline's data ingestion throughput, but also the read parallelism of a streaming job.

For example, conventional stream processing engines are adaptive at multiple levels (e.g., topology, deployment, processing, etc.) and this enables users and/or administrators (e.g., researches, developers, etc.) to explore auto-scaling mechanisms for these engines, in particular for increasingly heterogeneous applications. In recent efforts, administrators mostly focused on finding the minimum number of parallel stream engines that ensure stable/good performance while minimizing usage of computing resources. To this end, administrators (i) demonstrate a stream processing auto-scaling model specifically designed to meet latency requirements, (ii) demonstrate a predictive approach to auto-scale operator parallelism, and/or (iii) implement Bayesian optimization to adapt the computing resource and quality of service (QoS) relationship in streaming jobs.

However, conventional auto-scaling stream processing engines have overlooked the role of a data source in data stream processing pipelines, and existing approaches mainly focus on auto-scaling stream processing engines by exploiting compute-centric metrics such as central processing unit (CPU) utilization, throughput, and job queue sizes. None of the existing approaches takes into account end-to-end auto-scaling of a data stream processing pipeline, which necessarily includes a streaming storage system ingesting stream data. Further, even though Pravega shares one or more commonalities (e.g., with respect to data durability, per routing key order, etc.) with other streaming storage systems (e.g., Apache Kafka, Apache Pulsar, etc.), none of these systems provide simple means to dynamically change the parallelism of a data stream, in which not providing elastic data streams prevent these systems from supporting storage-compute elastic data stream processing pipelines.

For at least the reasons discussed above and without requiring resource (e.g., time, engineering, etc.) intensive efforts, a fundamentally different approach/framework is needed (e.g., an approach that leverages storage-compute auto-scaling for data stream processing pipelines, in which auto-scale components for stream processing modules are storage-aware, and therefore, can be able to exploit information from one or more source data streams).

Embodiments of the invention relate to methods and systems for managing a data stream processing pipeline. As a result of the processes discussed below, one or more embodiments disclosed herein advantageously ensure that: (i) exploitation of elastic data streams is enabled (which is a unique feature provided by Pravega) (a) to ingest data and (b) to support storage-compute elastic data stream processing pipelines (in which Pravega streams can dynamically change their parallelism based on ingestion workload and such information can be exploited for auto-scaling of a current streaming job); (ii) the minimum number of parallel stream processing modules are determined to achieve overall stable system performance while minimizing usage of computing resources; (iii) a fully functional storage-compute auto-scaling data stream processing pipeline that operates on Kubernetes (e.g., a portable, extensible, and open-source platform for managing containerized workloads and/or services) is provided; (iv) the auto-scaling notion of stream processing modules is augmented with information related to the source data stream(s) for a better user/customer experience (which is not possible today); (v) an orchestrator (e.g., an auto-scaling orchestrator) takes auto-scale decisions (based on obtained data stream metrics and/or resource related metrics) on, for example, task managers (e.g., processing workers) and/or segment stores; (vi) a stream processing job is managed for achieving the maximum practical processing parallelism under workload fluctuations, without requiring resource-intensive efforts (e.g., for a better product management and development); and/or (vii) users that want to perform real-time and/or batch processes across different nodes/computing devices are properly served.

The following describes various embodiments of the invention.

FIG. 1.1 shows a diagram of a system (100) in accordance with one or more embodiments of the invention. The system (100) includes any number of clients (e.g., Client A (110A), Client B (110B), etc.), a streaming storage system (125), a network (130), a long-term storage (140), any number of infrastructure nodes (INs) (e.g., IN A (120A), IN B (120B), etc.), and a stream processing system (102) (or a stream processing cluster). The system (100) may facilitate, at least, the management of "stream" data from any number of sources (e.g., 110A, 110B, etc.). The system (100) may include additional, fewer, and/or different components without departing from the scope of the invention. Each component may be operably/operatively connected to any of the other components via any combination of wired and/or wireless connections. Each component illustrated in FIG. 1.1 is discussed below.

In one or more embodiments, the clients (e.g., 110A, 110B, etc.), the streaming storage system (125), the network (130), the long-term storage (140), the INs (e.g., 120A, 120B, etc.), and the stream processing system (102) may be (or may include) physical hardware or logical devices, as discussed below. While FIG. 1.1 shows a specific configuration of the system (100), other configurations may be used without departing from the scope of the invention. For example, although the clients (e.g., 110A, 110B, etc.) and the INs (e.g., 120A, 120B, etc.) are shown to be operatively connected through a communication network (e.g., 130), the clients (e.g., 110A, 110B, etc.) and the INs (e.g., 120A, 120B, etc.) may be directly connected (e.g., without an intervening communication network).

Further, the functioning of the clients (e.g., 110A, 110B, etc.) and the INs (e.g., 120A, 120B, etc.) is not dependent upon the functioning and/or existence of the other components (e.g., devices) in the system (100). Rather, the clients and the INs may function independently and perform operations locally that do not require communication with other components. Accordingly, embodiments disclosed herein should not be limited to the configuration of components shown in FIG. 1.1.

As used herein, "communication" may refer to simple data passing, or may refer to two or more components coordinating a job. As used herein, the term "data" is intended to be broad in scope. In this manner, that term embraces, for example (but not limited to): a data stream (or stream data) (including multiple events, each of which is associated with a routing key) that are continuously produced by streaming data sources (e.g., writers, clients, etc.), data chunks, data blocks, atomic data, emails, objects of any type, files of any type (e.g., media files, spreadsheet files, database files, etc.), contacts, directories, sub-directories, volumes, etc.

In one or more embodiments, although terms such as "document", "file", "segment", "block", or "object" may be used by way of example, the principles of the present disclosure are not limited to any particular form of representing and storing data or other information. Rather, such principles are equally applicable to any object capable of representing information.

In one or more embodiments, the system (100) may be a distributed system (e.g., a data processing environment for processing streaming application data) and may deliver at least computing power (e.g., real-time network monitoring, server virtualization, etc.), storage capacity (e.g., data backup), and data protection (e.g., software-defined data protection, disaster recovery, etc.) as a service to users of clients (e.g., 110A, 110B, etc.). For example, the system may be configured to organize unbounded, continuously generated data into a stream (described below in reference to FIG. 1.2) that may be auto-scaled based on individual segment loading. The system (100) may also represent a comprehensive middleware layer executing on computing devices (e.g., 900, FIG. 9) that supports application and storage environments.

In one or more embodiments, the system (100) may support one or more virtual machine (VM) environments, and may map capacity requirements (e.g., computational load, storage access, etc.) of VMs and supported applications to available resources (e.g., processing resources, storage resources, etc.) managed by the environments. Further, the system (100) may be configured for workload placement collaboration and computing resource (e.g., processing, storage/memory, virtualization, networking, etc.) exchange.

To provide computer-implemented services to the users, the system (100) may perform some computations (e.g., data collection, distributed processing of collected data, etc.) locally (e.g., at the users' site using the clients (e.g., 110A, 110B, etc.)) and other computations remotely (e.g., away from the users' site using the INs (e.g., 120A, 120B, etc.)) from the users. By doing so, the users may utilize different computing devices (e.g., 900, FIG. 9) that have different quantities of computing resources (e.g., processing cycles, memory, storage, etc.) while still being afforded a consistent user experience. For example, by performing some computations remotely, the system (100) (i) may maintain the consistent user experience provided by different computing devices even when the different computing devices possess different quantities of computing resources, and (ii) may process data more efficiently in a distributed manner by avoiding the overhead associated with data distribution and/or command and control via separate connections.

As used herein, "computing" refers to any operations that may be performed by a computer, including (but not limited to): computation, data storage, data retrieval, communications, etc. Further, as used herein, a "computing device" refers to any device in which a computing operation may be carried out. A computing device may be, for example (but not limited to): a compute component, a storage component, a network device, a telecommunications component, etc.

As used herein, a "resource" refers to any program, application, document, file, asset, executable program file, desktop environment, computing environment, or other resource made available to, for example, a user of a client (described below). The resource may be delivered to the client via, for example (but not limited to): conventional installation, a method for streaming, a VM executing on a remote computing device, execution from a removable storage device connected to the client (such as universal serial bus (USB) device), etc.

In one or more embodiments, a client (e.g., 110A, 110B, etc.) may include functionality to, e.g.,: (i) capture sensory input (e.g., sensor data) in the form of text, audio, video, touch or motion, (ii) collect massive amounts of data at the edge of an IoT network (where, the collected data may be grouped as: (a) data that needs no further action and does not need to be stored, (b) data that should be retained for later analysis and/or record keeping, and (c) data that requires an immediate action/response), (iii) provide to other entities (e.g., the INs (e.g., 120A, 120B, etc.)), store, or otherwise utilize captured sensor data (and/or any other type and/or quantity of data), and (iv) provide surveillance services (e.g., determining object-level information, performing face recognition, etc.) for scenes (e.g., a physical region of space). One of ordinary skill will appreciate that the client may perform other functionalities without departing from the scope of the invention.

In one or more embodiments, the clients (e.g., 110A, 110B, etc.) may be geographically distributed devices (e.g., user devices, front-end devices, etc.) and may have relatively restricted hardware and/or software resources when compared to the INs (e.g., 120A, 120B, etc.). As being, for example, a sensing device, each of the clients may be adapted to provide monitoring services. For example, a client may monitor the state of a scene (e.g., objects disposed in a scene). The monitoring may be performed by obtaining sensor data from sensors that are adapted to obtain information regarding the scene, in which a client may include and/or be operatively coupled to one or more sensors (e.g., a physical device adapted to obtain information regarding one or more scenes).

In one or more embodiments, the sensor data may be any quantity and types of measurements (e.g., of a scene's properties, of an environment's properties, etc.) over any period(s) of time and/or at any points-in-time (e.g., any type of information obtained from one or more sensors, in which different portions of the sensor data may be associated with different periods of time (when the corresponding portions of sensor data were obtained)). The sensor data may be obtained using one or more sensors. The sensor may be, for example (but not limited to): a visual sensor (e.g., a camera adapted to obtain optical information (e.g., a pattern of light scattered off of the scene) regarding a scene), an audio sensor (e.g., a microphone adapted to obtain auditory information (e.g., a pattern of sound from the scene) regarding a scene), an electromagnetic radiation sensor (e.g., an infrared sensor), a chemical detection sensor, a temperature sensor, a humidity sensor, a count sensor, a distance sensor, a global positioning system sensor, a biological sensor, a differential pressure sensor, a corrosion sensor, etc.

In one or more embodiments, sensor data may be implemented as, for example, a list. Each entry of the list may include information representative of, for example, (i) periods of time and/or points-in-time associated with when a portion of sensor data included in the entry was obtained and/or (ii) the portion of sensor data. The sensor data may have different organizational structures without departing from the scope of the invention. For example, the sensor data may be implemented as a tree, a table, a linked list, etc.

In one or more embodiments, the clients (e.g., 110A, 110B, etc.) may be physical or logical computing devices configured for hosting one or more workloads, or for providing a computing environment whereon workloads may be implemented. The clients may provide computing environments that are configured for, at least: (i) workload placement collaboration, (ii) computing resource (e.g., processing, storage/memory, virtualization, networking, etc.) exchange, and (iii) protecting workloads (including their applications and application data) of any size and scale (based on, for example, one or more service level agreements (SLAs) configured by users of the clients). The clients (e.g., 110A, 110B, etc.) may correspond to computing devices that one or more users use to interact with one or more components of the system (100).

In one or more embodiments, a client (e.g., 110A, 110B, etc.) may include any number of applications (and/or content accessible through the applications) that provide computer-implemented services to a user. Applications may be designed and configured to perform one or more functions instantiated by a user of the client. In order to provide application services, each application may host similar or different components. The components may be, for example (but not limited to): instances of databases, instances of email servers, etc. Applications may be executed on one or more clients as instances of the application.

Applications may vary in different embodiments, but in certain embodiments, applications may be custom developed or commercial (e.g., off-the-shelf) applications that a user desires to execute in a client (e.g., 110A, 110B, etc.). In one or more embodiments, applications may be logical entities executed using computing resources of a client. For example, applications may be implemented as computer instructions stored on persistent storage of the client that when executed by the processor(s) of the client, cause the client to provide the functionality of the applications described throughout the application.

In one or more embodiments, while performing, for example, one or more operations requested by a user, applications installed on a client (e.g., 110A, 110B, etc.) may include functionality to request and use physical and logical resources of the client. Applications may also include functionality to use data stored in storage/memory resources of the client. The applications may perform other types of functionalities not listed above without departing from the scope of the invention. While providing application services to a user, applications may store data that may be relevant to the user in storage/memory resources of the client.

In one or more embodiments, to provide services to the users, the clients (e.g., 110A, 110B, etc.) may utilize, rely on, or otherwise cooperate with the INs (e.g., 120A, 120B, etc.). For example, the clients may issue requests to an IN of the INs to receive responses and interact with various components of the IN. The clients may also request data from and/or send data to the INs (for example, the clients may transmit information to an IN of the INs that allows the IN to perform computations, the results of which are used by the clients to provide services to the users). As yet another example, the clients may utilize application services provided by an IN of the INs. When the clients interact with an IN of the INs, data that is relevant to the clients may be stored (temporarily or permanently) in the IN.

In one or more embodiments, a client (e.g., 110A, 110B, etc.) may be capable of, e.g.,: (i) collecting users' inputs, (ii) correlating collected users' inputs to the computer-implemented services to be provided to the users, (iii) communicating with the INs (e.g., 120A, 120B, etc.) that perform computations necessary to provide the computer-implemented services, (iv) using the computations performed by the INs to provide the computer-implemented services in a manner that appears (to the users) to be performed locally to the users, and/or (v) communicating with any virtual desktop (VD) in a virtual desktop infrastructure (VDI) environment (or a virtualized architecture) provided by an IN (using any known protocol in the art), for example, to exchange remote desktop traffic or any other regular protocol traffic (so that, once authenticated, users may remotely access independent VDs).

As described above, the clients (e.g., 110A, 110B, etc.) may provide computer-implemented services to users (and/or other computing devices). The clients may provide any number and any type of computer-implemented services. To provide computer-implemented services, each client may include a collection of physical components (e.g., processing resources, storage/memory resources, networking resources, etc.) configured to perform operations of the client and/or otherwise execute a collection of logical components (e.g., virtualization resources) of the client.

In one or more embodiments, a processing resource (not shown) may refer to a measurable quantity of a processing-relevant resource type, which can be requested, allocated, and consumed. A processing-relevant resource type may encompass a physical device (i.e., hardware), a logical intelligence (i.e., software), or a combination thereof, which may provide processing or computing functionality and/or services. Examples of a processing-relevant resource type may include (but not limited to): a CPU, a graphics processing unit (GPU), a data processing unit (DPU), a computation acceleration resource, an application-specific integrated circuit (ASIC), a digital signal processor for facilitating high speed communication, etc.

In one or more embodiments, a storage or memory resource (not shown) may refer to a measurable quantity of a storage/memory-relevant resource type, which can be requested, allocated, and consumed (for example, to store sensor data and provide previously stored data). A storage/memory-relevant resource type may encompass a physical device, a logical intelligence, or a combination thereof, which may provide temporary or permanent data storage functionality and/or services. Examples of a storage/memory-relevant resource type may be (but not limited to): a hard disk drive (HDD), a solid-state drive (SSD), random access memory (RAM), Flash memory, a tape drive, a fibre-channel (FC) based storage device, a floppy disk, a diskette, a compact disc (CD), a digital versatile disc (DVD), a non-volatile memory express (NVMe) device, a NVMe over Fabrics (NVMe-oF) device, resistive RAM (ReRAM), persistent memory (PMEM), virtualized storage, virtualized memory, etc.

In one or more embodiments, while the clients (e.g., 110A, 110B, etc.) provide computer-implemented services to users, the clients may store data that may be relevant to the users to the storage/memory resources. When the user-relevant data is stored (temporarily or permanently), the user-relevant data may be subjected to loss, inaccessibility, or other undesirable characteristics based on the operation of the storage/memory resources.

To mitigate, limit, and/or prevent such undesirable characteristics, users of the clients (e.g., 110A, 110B, etc.) may enter into agreements (e.g., SLAs) with providers (e.g., vendors) of the storage/memory resources. These agreements may limit the potential exposure of user-relevant data to undesirable characteristics. These agreements may, for example, require duplication of the user-relevant data to other locations so that if the storage/memory resources fail, another copy (or other data structure usable to recover the data on the storage/memory resources) of the user-relevant data may be obtained. These agreements may specify other types of activities to be performed with respect to the storage/memory resources without departing from the scope of the invention.

In one or more embodiments, a networking resource (not shown) may refer to a measurable quantity of a networking-relevant resource type, which can be requested, allocated, and consumed. A networking-relevant resource type may encompass a physical device, a logical intelligence, or a combination thereof, which may provide network connectivity functionality and/or services. Examples of a networking-relevant resource type may include (but not limited to): a network interface card (NIC), a network adapter, a network processor, etc.

In one or more embodiments, a networking resource may provide capabilities to interface a client with external entities (e.g., the INs (e.g., 120A, 120B, etc.)) and to allow for the transmission and receipt of data with those entities. A networking resource may communicate via any suitable form of wired interface (e.g., Ethernet, fiber optic, serial communication etc.) and/or wireless interface, and may utilize one or more protocols (e.g., transport control protocol (TCP), user datagram protocol (UDP), Remote Direct Memory Access, IEEE 801.11, etc.) for the transmission and receipt of data.

In one or more embodiments, a networking resource may implement and/or support the above-mentioned protocols to enable the communication between the client and the external entities. For example, a networking resource may enable the client to be operatively connected, via Ethernet, using a TCP protocol to form a "network fabric", and may enable the communication of data between the client and the external entities. In one or more embodiments, each client may be given a unique identifier (e.g., an Internet Protocol (IP) address) to be used when utilizing the above-mentioned protocols.

Further, a networking resource, when using a certain protocol or a variant thereof, may support streamlined access to storage/memory media of other clients (e.g., 110A, 110B, etc.). For example, when utilizing remote direct memory access (RDMA) to access data on another client, it may not be necessary to interact with the logical components of that client. Rather, when using RDMA, it may be possible for the networking resource to interact with the physical components of that client to retrieve and/or transmit data, thereby avoiding any higher-level processing by the logical components executing on that client.

In one or more embodiments, a virtualization resource (not shown) may refer to a measurable quantity of a virtualization-relevant resource type (e.g., a virtual hardware component), which can be requested, allocated, and consumed, as a replacement for a physical hardware component. A virtualization-relevant resource type may encompass a physical device, a logical intelligence, or a combination thereof, which may provide computing abstraction functionality and/or services. Examples of a virtualization-relevant resource type may include (but not limited to): a virtual server, a VM, a container, a virtual CPU (vCPU), a virtual storage pool, etc.

In one or more embodiments, a virtualization resource may include a hypervisor (e.g., a VM monitor), in which the hypervisor may be configured to orchestrate an operation of, for example, a VM by allocating computing resources of a client (e.g., 110A, 110B, etc.) to the VM. In one or more embodiments, the hypervisor may be a physical device including circuitry. The physical device may be, for example (but not limited to): a field-programmable gate array (FPGA), an application-specific integrated circuit, a programmable processor, a microcontroller, a digital signal processor, etc. The physical device may be adapted to provide the functionality of the hypervisor. Alternatively, in one or more of embodiments, the hypervisor may be implemented as computer instructions stored on storage/memory resources of the client that when executed by processing resources of the client, cause the client to provide the functionality of the hypervisor.

In one or more embodiments, a client (e.g., 110A, 110B, etc.) may be, for example (but not limited to): a physical computing device, a smartphone, a tablet, a wearable, a gadget, a closed-circuit television (CCTV) camera, a music player, a game controller, etc. Different clients may have different computational capabilities. In one or more embodiments, Client A (110A) may have 16 gigabytes (GB) of DRAM and 1 CPU with 12 cores, whereas Client N (110N) may have 8 GB of PMEM and 1 CPU with 16 cores. Other different computational capabilities of the clients not listed above may also be taken into account without departing from the scope of the invention.

Figure 9:
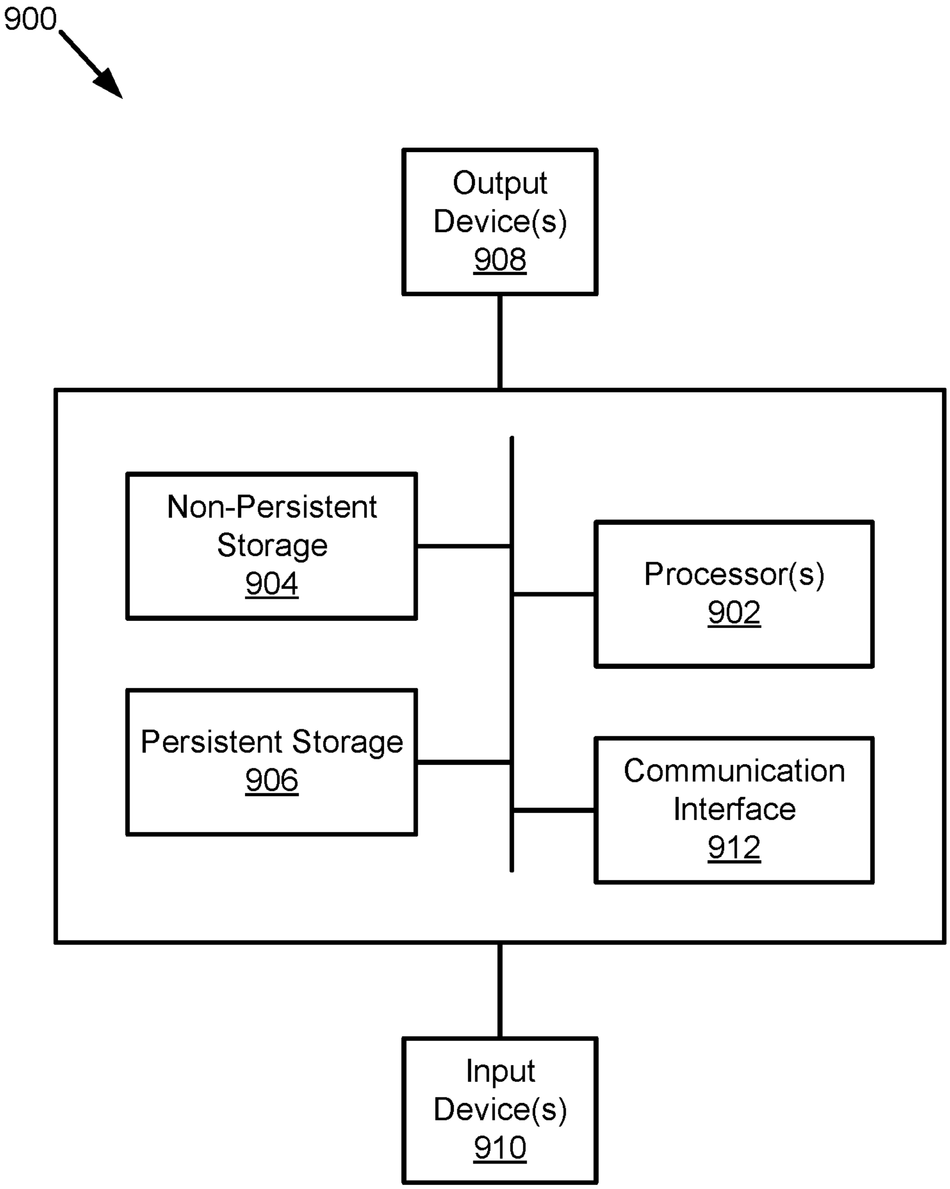
FIG. 9 shows a diagram of a computing device in accordance with one or more embodiments of the invention.

Further, in one or more embodiments, a client (e.g., 110A, 110B, etc.) may be implemented as a computing device (e.g., 900, FIG. 9). The computing device may be, for example, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the client described throughout the application.

Alternatively, in one or more embodiments, the client (e.g., 110A, 110B, etc.) may be implemented as a logical device (e.g., a VM). The logical device may utilize the computing resources of any number of computing devices to provide the functionality of the client described throughout this application.

In one or more embodiments, users may interact with (or operate) the clients (e.g., 110A, 110B, etc.) in order to perform work-related tasks (e.g., production workloads). In one or more embodiments, the accessibility of users to the clients may depend on a regulation set by an administrator of the clients. To this end, each user may have a personalized user account that may, for example, grant access to certain data, applications, and computing resources of the clients. This may be realized by implementing the virtualization technology. In one or more embodiments, an administrator may be a user with permission (e.g., a user that has root-level access) to make changes on the clients that will affect other users of the clients.

In one or more embodiments, for example, a user may be automatically directed to a login screen of a client when the user connected to that client. Once the login screen of the client is displayed, the user may enter credentials (e.g., username, password, etc.) of the user on the login screen. The login screen may be a graphical user interface (GUI) generated by a visualization module (not shown) of the client. In one or more embodiments, the visualization module may be implemented in hardware (e.g., circuitry), software, or any combination thereof.

In one or more embodiments, a GUI may be displayed on a display of a computing device (e.g., 900, FIG. 9) using functionalities of a display engine (not shown), in which the display engine is operatively connected to the computing device. The display engine may be implemented using hardware (or a hardware component), software (or a software component), or any combination thereof. The login screen may be displayed in any visual format that would allow the user to easily comprehend (e.g., read and parse) the listed information.

In one or more embodiments, an IN (e.g., 120A) of the INs may include (i) a chassis (e.g., a mechanical structure, a rack mountable enclosure, etc.) configured to house one or more servers (or blades) and their components and (ii) any instrumentality or aggregate of instrumentalities operable to compute, classify, process, transmit, receive, retrieve, originate, switch, store, display, manifest, detect, record, reproduce, handle, and/or utilize any form of data for business, management, entertainment, or other purposes.

In one or more embodiments, an IN (e.g., 120A, 120B, etc.) may include functionality to, e.g.,: (i) obtain (or receive) data (e.g., any type and/or quantity of input) from any source (and, if necessary, aggregate the data); (ii) perform complex analytics and analyze data that is received from one or more clients (e.g., 110A, 110B, etc.) to generate additional data that is derived from the obtained data without experiencing any middleware and hardware limitations; (iii) provide meaningful information (e.g., a response) back to the corresponding clients; (iv) filter data (e.g., received from a client) before pushing the data (and/or the derived data) to the long-term storage (140) for management of the data and/or for storage of the data (while pushing the data, the IN may include information regarding a source of the data (e.g., an identifier of the source) so that such information may be used to associate provided data with one or more of the users (or data owners)); (v) host and maintain various workloads; (vi) provide a computing environment whereon workloads may be implemented (e.g., employing a linear, non-linear, and/or machine learning (ML) model to perform cloud-based data processing); (vii) incorporate strategies (e.g., strategies to provide VDI capabilities) for remotely enhancing capabilities of the clients; (viii) provide robust security features to the clients and make sure that a minimum level of service is always provided to a user of a client; (ix) transmit the result(s) of the computing work performed (e.g., real-time business insights, equipment maintenance predictions, other actionable responses, etc.) to another IN (e.g., 120N) for review and/or other human interactions; (x) exchange data with other devices registered in/to the network (130) in order to, for example, participate in a collaborative workload placement (e.g., the node may split up a request (e.g., an operation, a task, an activity, etc.) with another IN (e.g., 120N), coordinating its efforts to complete the request more efficiently than if the IN had been responsible for completing the request); (xi) provide software-defined data protection for the clients (e.g., 110A, 110B, etc.); (xii) provide automated data discovery, protection, management, and recovery operations for the clients; (xiii) monitor operational states of the clients; (xiv) regularly back up configuration information of the clients to the long-term storage (140); (xv) provide (e.g., via a broadcast, multicast, or unicast mechanism) information (e.g., a location identifier, the amount of available resources, etc.) associated with the IN to other INs (e.g., 120B, 120N, etc.); (xvi) configure or control any mechanism that defines when, how, and what data to provide to the clients and/or long-term storage; (xvii) provide data deduplication; (xviii) orchestrate data protection through one or more GUIs; (xix) empower data owners (e.g., users of the clients) to perform self-service data backup and restore operations from their native applications; (xx) ensure compliance and satisfy different types of service level objectives (SLOs) set by an administrator/user; (xxi) increase resiliency of an organization by enabling rapid recovery or cloud disaster recovery from cyber incidents; (xxii) provide operational simplicity, agility, and flexibility for physical, virtual, and cloud-native environments; (xxiii) consolidate multiple data process or protection requests (received from, for example, clients) so that duplicative operations (which may not be useful for restoration purposes) are not generated; (xxiv) initiate multiple data process or protection operations in parallel (e.g., an IN may host multiple operations, in which each of the multiple operations may (a) manage the initiation of a respective operation and (b) operate concurrently to initiate multiple operations); and/or (xxv) manage operations of one or more clients (e.g., receiving information from the clients regarding changes in the operation of the clients) to improve their operations (e.g., improve the quality of data being generated, decrease the computing resources cost of generating data, etc.). In one or more embodiments, in order to read, write, or store data, the IN (e.g., 120A) may communicate with, for example, the long-term storage (140) and/or other databases.

In one or more embodiments, monitoring the operational states of the clients (e.g., 110A, 110B, etc.) may be used to determine whether it is likely that the monitoring of the scenes by the clients results in information regarding the scenes that accurately reflects the states of the scenes (e.g., a client may provide inaccurate information regarding a monitored scene). Said another way, by providing monitoring services, the IN (e.g., 120A) may be able to determine whether a client is malfunctioning (e.g., the operational state of a client may change due to a damage to the client, malicious action (e.g., hacking, a physical attack, etc.) by third-parties, etc.). If the client is not in the predetermined operational state (e.g., if the client is malfunctioning), the IN may take action to remediate the client. Remediating the client may result in the client being placed in the predetermined operational state which improves the likelihood that monitoring of the scene by the client results in the generation of accurate information regarding the scene.

As described above, an IN (e.g., 120A) of the INs may be capable of providing a range of functionalities/services to the users of the clients (e.g., 110A, 110B, etc.). However, not all of the users may be allowed to receive all of the services. To manage the services provided to the users of the clients, a system (e.g., a service manager) in accordance with embodiments of the invention may manage the operation of a network (e.g., 130), in which the clients are operably connected to the IN. Specifically, the service manager (i) may identify services to be provided by the IN (for example, based on the number of users using the clients) and (ii) may limit communications of the clients to receive IN provided services.

For example, the priority (e.g., the user access level) of a user may be used to determine how to manage computing resources of the IN (e.g., 120A) to provide services to that user. As yet another example, the priority of a user may be used to identify the services that need to be provided to that user. As yet another example, the priority of a user may be used to determine how quickly communications (for the purposes of providing services in cooperation with the internal network (and its subcomponents)) are to be processed by the internal network.

Further, consider a scenario where a first user is to be treated as a normal user (e.g., a non-privileged user, a user with a user access level/tier of 4/10). In such a scenario, the user level of that user may indicate that certain ports (of the subcomponents of the network (130) corresponding to communication protocols such as the TCP, the UDP, etc.) are to be opened, other ports are to be blocked/disabled so that (i) certain services are to be provided to the user by the IN (e.g., 120A) (e.g., while the computing resources of the IN may be capable of providing/performing any number of remote computer-implemented services, they may be limited in providing some of the services over the network (130)) and (ii) network traffic from that user is to be afforded a normal level of quality (e.g., a normal processing rate with a limited communication bandwidth (BW)). By doing so, (i) computer-implemented services provided to the users of the clients (e.g., 110A, 110B, etc.) may be granularly configured without modifying the operation(s) of the clients and (ii) the overhead for managing the services of the clients may be reduced by not requiring modification of the operation(s) of the clients directly.

In contrast, a second user may be determined to be a high priority user (e.g., a privileged user, a user with a user access level of 9/10). In such a case, the user level of that user may indicate that more ports are to be opened than were for the first user so that (i) the IN (e.g., 120A) may provide more services to the second user and (ii) network traffic from that user is to be afforded a high-level of quality (e.g., a higher processing rate than the traffic from the normal user).

As used herein, a "workload" is a physical or logical component configured to perform certain work functions. Workloads may be instantiated and operated while consuming computing resources allocated thereto. A user may configure a data protection policy for various workload types. Examples of a workload may include (but not limited to): a data protection workload, a VM, a container, a network-attached storage (NAS), a database, an application, a collection of microservices, a file system (FS), small workloads with lower priority workloads (e.g., FS host data, OS data, etc.), medium workloads with higher priority (e.g., VM with FS data, network data management protocol (NDMP) data, etc.), large workloads with critical priority (e.g., mission critical application data), etc.

Further, while a single IN (e.g., 120A) is considered above, the term "node" includes any collection of systems or sub-systems that individually or jointly execute a set, or multiple sets, of instructions to provide one or more computer-implemented services. For example, a single infrastructure node may provide a computer-implemented service on its own (i.e., independently) while multiple other nodes may provide a second computer-implemented service cooperatively (e.g., each of the multiple other nodes may provide similar and or different services that form the cooperatively provided service).

As described above, an IN (e.g., 120A) of the INs may provide any quantity and any type of computer-implemented services. To provide computer-implemented services, the IN may be a heterogeneous set, including a collection of physical components/resources (discussed above) configured to perform operations of the node and/or otherwise execute a collection of logical components/resources (discussed above) of the node.

In one or more embodiments, an IN (e.g., 120A) of the INs may implement a management model to manage the aforementioned computing resources in a particular manner. The management model may give rise to additional functionalities for the computing resources. For example, the management model may automatically store multiple copies of data in multiple locations when a single write of the data is received. By doing so, a loss of a single copy of the data may not result in a complete loss of the data. Other management models may include, for example, adding additional information to stored data to improve its ability to be recovered, methods of communicating with other devices to improve the likelihood of receiving the communications, etc. Any type and number of management models may be implemented to provide additional functionalities using the computing resources without departing from the scope of the invention.

One of ordinary skill will appreciate that an IN (e.g., 120A) of the INs may perform other functionalities without departing from the scope of the invention. In one or more embodiments, the IN may be configured to perform (in conjunction with the streaming storage system (125)) all, or a portion, of the functionalities described in FIGS. 6-8.3.

In one or more embodiments, an IN (e.g., 120A) of the INs may be implemented as a computing device (e.g., 900, FIG. 9). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the IN described throughout the application.

Alternatively, in one or more embodiments, similar to a client (e.g., 110A, 110B, etc.), the IN may also be implemented as a logical device.

In one or more embodiments, an IN (e.g., 120A) of the INs may host an orchestrator (127). Additional details of the orchestrator are described below in reference to FIGS. 1.1 and 2-5. In the embodiments of the present disclosure, the streaming storage system (125) is demonstrated as a separate entity from the INs; however, embodiments herein are not limited as such. The streaming storage system (125) may be demonstrated as a part of an IN (e.g., as deployed to the IN). Additional details of the streaming storage system and the long-term storage (140) are described below in reference to FIG. 1.2. Similarly, in the embodiments of the present disclosure, the orchestrator (127) is demonstrated as a part of an IN (e.g., as deployed to the IN); however, embodiments herein are not limited as such. The orchestrator (127) may be a separate entity from the IN.

In one or more embodiments, all, or a portion, of the components of the system (100) may be operably connected each other and/or other entities via any combination of wired and/or wireless connections. For example, the aforementioned components may be operably connected, at least in part, via the network (130). Further, all, or a portion, of the components of the system (100) may interact with one another using any combination of wired and/or wireless communication protocols.

In one or more embodiments, the network (130) may represent a (decentralized or distributed) computing network and/or fabric configured for computing resource and/or messages exchange among registered computing devices (e.g., the clients, the INs, etc.). As discussed above, components of the system (100) may operatively connect to one another through the network (e.g., a storage area network (SAN), a personal area network (PAN), a LAN, a metropolitan area network (MAN), a WAN, a mobile network, a wireless LAN (WLAN), a virtual private network (VPN), an intranet, the Internet, etc.), which facilitates the communication of signals, data, and/or messages. In one or more embodiments, the network may be implemented using any combination of wired and/or wireless network topologies, and the network may be operably connected to the Internet or other networks. Further, the network (130) may enable interactions between, for example, the clients and the INs through any number and type of wired and/or wireless network protocols (e.g., TCP, UDP, IPv4, etc.).

The network (130) may encompass various interconnected, network-enabled subcomponents (not shown) (e.g., switches, routers, gateways, cables etc.) that may facilitate communications between the components of the system (100). In one or more embodiments, the network-enabled subcomponents may be capable of: (i) performing one or more communication schemes (e.g., IP communications, Ethernet communications, etc.), (ii) being configured by one or more components in the network, and (iii) limiting communication(s) on a granular level (e.g., on a per-port level, on a per-sending device level, etc.). The network (130) and its subcomponents may be implemented using hardware, software, or any combination thereof.

In one or more embodiments, before communicating data over the network (130), the data may first be broken into smaller batches (e.g., data packets) so that larger size data can be communicated efficiently. For this reason, the network-enabled subcomponents may break data into data packets. The network-enabled subcomponents may then route each data packet in the network (130) to distribute network traffic uniformly.

In one or more embodiments, the network-enabled subcomponents may decide how real-time (e.g., on the order of ms or less) network traffic and non-real-time network traffic should be managed in the network (130). In one or more embodiments, the real-time network traffic may be high-priority (e.g., urgent, immediate, etc.) network traffic. For this reason, data packets of the real-time network traffic may need to be prioritized in the network (130). The real-time network traffic may include data packets related to, for example (but not limited to): videoconferencing, web browsing, voice over Internet Protocol (VoIP), etc.

Turning now to the stream processing system (102), the stream processing system (102) represents a distributed system that performs effective allocation and management of compute resources (or computing resources) in order to, at least, execute one or more streaming applications and recover from failures. In one or more embodiments, the stream processing system (102) includes any number of job managers (e.g., Job Manager A (106A), Job Manager B (106B), etc.) and any number of task managers (e.g., Task Manager A (108A), Task Manager B (108B), etc.) to provide a high-availability framework. The stream processing system (102) may include additional, fewer, and/or different components without departing from the scope of the invention. Each component may be operably connected to any of the other component via any combination of wired and/or wireless connections. Each component illustrated in the stream processing system is discussed below.

In one or more embodiments, a job manager (e.g., 106A) of the job managers (e.g., master nodes) may include functionality to, e.g.,: (i) be started directly as a standalone computing device, in containers, or managed by a resource framework; (ii) be dedicated to the management of one or more task managers (e.g., 108A, 108B, etc.) (including management of policy actions on a task manager); (iii) coordinate distributed execution of streaming applications; (iv) decide when to schedule the next task (or a set of tasks) to be executed on one or more task managers; (v) obtain a status of an initiated task from a corresponding task manager, in which the status of the initiated task may specify information such as: (a) whether the task was successful and whether the task was completed within a predetermined period of time (e.g., 100% of the task was completed within the predetermined period of time), or (b) whether the task was unsuccessful and how much of the task was not completed within the predetermined period of time (e.g., 70% of the task was completed and 30% of the task was not completed); (vi) based on (v), react to completed tasks and/or execution failures (e.g., not completed tasks), coordinate checkpoints for recovery; (vii) be responsible for computing resource allocation (and deallocation) within the stream processing system (102) (e.g., manage distribution or allocation of available computing resources (e.g., user subscriptions to available resources) against a particular task manager); (viii) provide an interface (e.g., a representational state transfer (REST) interface) to communicate with other components of the stream processing system (102) (e.g., to submit streaming applications (to one or more task managers) for parallel execution) with minimum amount of latency (e.g., with high-throughput (e.g., a high data transfer rate) and sub-ms latency); (ix) execute a GUI, for example, to provide information about application/job executions to an administrator of the orchestrator (127) and/or to notify the administrator with respect to a determined workload-to-task manager assignment; (x) receive a request (e.g., a workload/job request) from a user via a client (e.g., receiving a request to execute a certain application or functionality on a task manager) via the interface; (xi) analyze an intention specified in a request received from a user, for example, to decide where (e.g., which task manager) to deploy one or more workloads (or streaming applications); (xii) be dedicated to binding (or assigning) streaming applications, sought to be implemented, to one or more task managers; (xiii) deploy one or more workloads to an appropriate task manager based on (a) available computing resources (e.g., computing, memory, storage, virtualization, etc.) of the task manager and/or (b) one or more workload requirements; (xiv) monitor the availability of computing resources on each of the task managers; (xv) communicate with each task manager across the stream processing system (102) to infer which task manager is healthy (or unhealthy); (xvi) based on (xv), provide health status of each task manager (as part of "resource related metrics") to the orchestrator (127); (xvii) ensure that workloads are distributed evenly (across as many task managers as possible); (xviii) coordinate distributed execution of a dataflow; (xix) track state and progress of each operator (hosted by a corresponding task manager); and/or (xx) store (temporarily or permanently) the aforementioned data and/or the output(s) of the above-discussed processes in a storage device (e.g., 140).

One of ordinary skill will appreciate that the job manager may perform other functionalities without departing from the scope of the invention.

In one or more embodiments, the interface may represent an application programming interface (API) for the stream processing system (102). To that extent, the interface may employ a set of subroutine definitions, protocols, and/or hardware/software components for enabling communications between the stream processing system and external entities (e.g., the orchestrator (127)). The interface may also facilitate communications between the job manager (e.g., 106A) and one or more task managers (e.g., 108A, 108B, etc.). In one or more embodiments, the interface may perform the following additional functionalities (but not limited to): deploying (in conjunction with the job manager) workloads to one or more task managers, receiving and validating (in conjunction with the job manager) workload requests from external entities, etc.

One of ordinary skill will appreciate that the interface may perform other functionalities without departing from the scope of the invention. The interface may be implemented using hardware, software, or any combination thereof.

In one or more embodiments, a job manager (e.g., 106A) may be implemented as a computing device (e.g., 900, FIG. 9). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the job manager described throughout the application.

Alternatively, in one or more embodiments, similar to a client (e.g., 110A, 110B, etc.), the job manager may also be implemented as a logical device.

In one or more embodiments, a task manager (e.g., 108A) of the task managers (e.g., worker nodes) may include functionality to, e.g.,: (i) be started directly as a standalone computing device, in containers, or managed by a resource framework; (ii) interact with a job manager (e.g., 106A) and announce itself as available (or not available) (at least to receive workloads sought for implementation and report task manager pertinent state information) (e.g., report its status to a related job manager); (iii) based on (ii), receive one or more workloads from a job manager (e.g., be dedicated to the execution of workloads presented/deployed to the stream processing system (102) to provide computer-implemented services); (iv) execute one or more tasks of a dataflow/job/workload (e.g., reading one or more events from a data stream (ingested by the streaming storage system (125)) and performing computations (e.g., text manipulation, numerical analysis, image manipulation, etc.) on the data stream); (v) buffer and/or exchange one or more data streams with another task manager (e.g., to perform a batch analysis); (vi) together with one or more job managers and the streaming storage system (e.g., as a data ingestion service), be part of a data stream processing pipeline; (vii) periodically review resource requests and limits for various workloads and compare them against what was actually used; (viii) manage (in conjunction with a corresponding job manager) a group of replicas of a particular task manager to make sure there are always the specified number of replicas in the stream processing system; (ix) in conjunction with the orchestrator and a corresponding job manager, allow the generation, removal, maintenance, scheduling, and/or configuration of one or more task managers by using computing resources assigned to the task manager; (x) provide automated data discovery, deduplication, protection, management, and/or recovery operations in on-premises; (xi) empower data owners (e.g., users of the clients) to perform self-service data backup and restore operations from their native applications; (xii) execute one or more operators (e.g., a mapper operator, a reducer operator, etc.) that generate streams of processed data to other operators; and/or (xiii) store (temporarily or permanently) the aforementioned data and/or the output(s) of the above-discussed processes in a storage device (e.g., 140).

One of ordinary skill will appreciate that the task manager may perform other functionalities without departing from the scope of the invention.

In one or more embodiments, composed/generated task managers may either execute tasks/jobs as a non-parallel (i.e., serial) process or as multiple parallel processes. As a non-parallel process, any task manager may be instantiated and execute tasks at any given time. When an instantiated task manager fails, for any number of reasons, a newer task manager may be instantiated to continue execution of the tasks. Should this newer task manager also fails, another new task manager may be instantiated to take its place. This non-parallel processing of the tasks continues until the tasks associated with the given workload successfully complete.

On the other hand, as a parallel process, any set of two or more task managers (e.g., 108A, 108B, etc.) may be instantiated and execute tasks at any given time. Successful completion of the tasks may be defined through a different metric (e.g., a specified number of successful completions by an equal specified number of task managers). Each successful completion of the tasks may be tracked until the specified number of successful completions is reached, where at that point, the parallel processing of the tasks officially complete and terminate. When any given task manager fails, one or more newer task managers may be instantiated in place of the failed task manager.

By way of a simplified example, a workload may be defined through three different tasks (or processes), e.g., a main process, which may handle the bulk of the workload, and two assistant processes, which may focus on the performance of minor responsibilities. In one embodiment, a first task manager (e.g., 108C) may be instantiated to execute the main process, while a second task manager (e.g., 108N) may be instantiated to execute the two assistant processes. In another embodiment, three separate task managers may be instantiated to execute each different task (or process), respectively. Further, any given task manager, may fail for any number of reasons. When a failure transpires, a newer task manager may be instantiated to continue the subset of tasks (or processes) for which the failed task manager had been responsible.

To provide any quantity and any type of computer-implemented services, a task manager (e.g., 108A) may utilize computing resources provided by various hardware components and/or logical components (e.g., virtualization resources). In one or more embodiments, a computing resource (e.g., a measurable quantity of a compute-relevant resource type that may be requested, allocated, and/or consumed) may be (or may include), for example (but not limited to): a CPU, a GPU, a DPU, a memory resource, a network resource, storage space/source (e.g., to store any type and quantity of information), storage I/O, a hardware resource set, a compute resource set (e.g., one or more processors, processor dedicated memory, etc.), a control resource set, etc.

In one or more embodiments, computing resources of a task manager (e.g., 108A) may be divided into three logical resource sets (e.g., a compute resource set, a control resource set, and a hardware resource set that may be implemented as separate physical devices). By logically dividing the computing resources of a task manager into these resource sets, different quantities and types of computing resources may be allocated to each task manager and/or a composed task manager. Dividing the computing resources in accordance with the three set model may enable different resource sets to be differentiated (e.g., given different personalities) to provide different functionalities. Further, different resource sets, or portions thereof, from the same or different task managers may be aggregated to instantiate, for example, a composed task manager having at least one resource set from each set of the three resource set model. Consequently, task managers may be composed on the basis of desired functionalities rather than just on the basis of aggregate resources to be included in the composed task managers.

As described above, to instantiate a composed task manager (e.g., a newer task manager), the task managers (e.g., 108A, 108B, etc.) may include at least three resource sets including a control resource set. The control resource set may include a processor, in which the corresponding processor of each task manager may coordinate with a corresponding job manager (e.g., 106A) and/or the orchestrator (127) to enable a composed task manager to be instantiated. For example, a processor of a task manager may provide telemetry data regarding computing resources of the task manager (e.g., to the orchestrator), may perform actions on behalf of the orchestrator to aggregate computing resources together, may organize the performance of duplicative workloads to improve the likelihood that workloads are completed, and/or may provide services that unify the operation of a composed task manager.

Further, a processor of a task manager (e.g., 108A) may mediate presentation of computing resources provided by the hardware resources (of the task manager) to a compute resource set (e.g., as bare metal resources). When doing so, the processor may provide a layer of abstraction that enables the hardware resources to be, for example, virtualized, emulated as being compatible with other systems, and/or directly connected to the compute resource set (e.g., pass through). Consequently, the computing resources of the hardware resources may be finely, or at a macro level, allocated to different composed task managers.

In one or more embodiments, a control resource set (e.g., of a task manager) may facilitate formation of, for example, a composed task manager within the stream processing system (102). To do so, a control resource set may prepare any quantity of computing resources from any number of hardware resource sets (e.g., of corresponding task managers) for presentation. Once prepared, the control resource set may present the prepared computing resources as bare metal resources to a composer (not shown) of a job manager (e.g., 106A). By doing so, a composed task manager may be instantiated.

To prepare the computing resources of the hardware resource sets for presentation, the control resource set may employ, for example, virtualization, indirection, abstraction, and/or emulation. These management functionalities may be transparent to applications hosted by the instantiated/composed task manager. Consequently, while unknown to components of a composed task manager, the composed task manager may operate in accordance with any number of management models thereby providing for unified control and management of the composed task manager.

In one or more embodiments, as a composed task manager (e.g., 108C) is instantiated, a corresponding job manager (e.g., 106A) may add information reflecting resources allocated to the composed task manager, workloads being performed by the composed task manager, and/or other types of information to a composed task manager map (managed by the orchestrator (127)). The orchestrator may utilize this information to, for example, decide whether computing resources should be added to or removed from one or more task managers. Consequently, computing resources may be dynamically re-provisioned over to meet changing workloads imposed on the task managers.

In one or more embodiments, a task manager (e.g., 108A) may be implemented as a computing device (e.g., 900, FIG. 9). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the task manager described throughout the application.

Alternatively, in one or more embodiments, similar to a client (e.g., 110A, 110B, etc.), the task manager may also be implemented as a logical device.

While the stream processing system (102) has been illustrated and described as including a limited number of specific components, the stream processing system (102) may include additional, fewer, and/or different components than those mentioned above without departing from the scope of the invention.

In one or more embodiments, the stream processing system (102) may host multiple task managers, making a task manager highly available; that is, if any task manager fails or is shut down (which may directly affect applications/jobs being executed), or one of components of a task manager fails, the stream processing system will still work properly. Similarly, the stream processing system (102) may host multiple job managers, making a job manager highly available; that is, if any job manager fails or is shut down (which may directly affect applications/jobs being executed), or one of components of a job manager fails, the stream processing system will still work properly.

In one or more embodiments, in order to provide redundancy and failover capabilities (so that a user may execute an application in a more reliable and resilient way), the stream processing system (102) may spin up a newer version of the stream processing system in parallel and switch traffic to the newer system/cluster once the newer cluster is ready. Further, the stream processing system may operate as a provider agnostic system (e.g., the system (and its components) may operate seamlessly regardless of the underlying provider).

In one or more embodiments, the job managers (e.g., 106A, 106B, etc.), the task managers (e.g., 108A, 108B, etc.), and the interface may be utilized in isolation and/or in combination to provide the above-discussed functionalities. These functionalities may be invoked using any communication model including, for example, message passing, state sharing, memory sharing, etc. By doing so, the stream processing system (102) may address issues related to data security, integrity, and availability proactively.

Further, some of the above-discussed functionalities may be performed using available resources or when resources of the stream processing system (102) are not otherwise being consumed. By performing these functionalities when resources are available, these functionalities may not be burdensome on the resources of the stream processing system and may not interfere with more primary workloads performed by stream processing system.

Turning now to the orchestrator (127), the orchestrator (127) may include functionality to, e.g.,: (i) monitor data stream ingestion of the streaming storage system (125) to obtain (or receive) data stream metrics (described below); (ii) monitor a resource utilization value (RUV) of a computing resource (e.g., over a certain period of time, such as during the last two hours) associated with the stream processing system (102) (more specifically, associated with a task manager (e.g., 108A)) to obtain (or receive) resource related metrics (described below); (iii) based on one or more user-defined and/or vendor-defined scaling policies (described below), analyze (without the requirement of resource-intensive efforts) the data stream metrics to extract useful and detailed insights data (described below) by employing a set of linear, non-linear, and/or ML models; (iv) based on one or more user-defined scaling policies, analyze (without the requirement of resource-intensive efforts) the resource related metrics to extract useful and detailed insights data by employing a set of linear, non-linear, and/or ML models; (v) based on (iii) and (iv) and for each task manager and segment store (described below in reference to FIG. 1.2), generate a holistic view that indicates, at least, how each component has been utilized; (vi) based on (iii) and (iv), determine whether or not a task manager scaling is required; (vii) based on (iii), (iv), and (vi), determine whether or not a segment store scaling is required; (viii) based on (vii), determine whether or not an end-to-end write latency exceeds a predetermined write latency threshold value (e.g., a 95th percentile of the end-to-end write latency should not exceed 100 ms); (ix) based on (viii) and in conjunction with the streaming storage system (125), automatically react and modify a quantity of segment stores in order to (a) establish a low end-to-end write latency across a data stream processing pipeline and (b) distribute data stream ingestion across a larger quantity of segment stores for a better user experience; (x) based on (iii), (iv), and (vi), determine whether or not data stream ingestion is increased; (xi) based on (x), determine whether or not the RUV of the resource exceeds a predetermined maximum RUV threshold value; (xii) based on (xi) and in conjunction with the stream processing system (102), automatically react and modify a quantity of task managers in order to reduce the RUV of the resource; and/or (xiii) store (temporarily or permanently) the aforementioned data and/or the output(s) of the above-discussed processes in a storage device (e.g., a database hosted by IN A (120A), 140, etc.).

Further, the orchestrator (127) may include functionality to, e.g.,: (i) perform analytics pertinent to the streaming storage system (125) and the stream processing system (102); (ii) monitor the availability of computing resources on each task manager; (iii) in conjunction with the corresponding job manager(s), perform load balancing and auto-scaling when, for example, CPU utilization of a task manager reaches a certain level by keep adding new task managers until the utilization falls behind a predetermined threshold (e.g., the orchestrator may handle demand spikes and achieve higher utilization of task managers by managing idle (hardware or logical) resource capacity across the task managers); (iv) in conjunction with the corresponding job manager(s), ensure that workloads/jobs are distributed evenly (across as many task managers as possible) to maintain high-availability for services; (v) in conjunction with the corresponding job manager(s) and at the deployment level, monitor task manager deployments across the stream processing system (in particular, unavailable task managers, which may indicate a capacity problem); (vi) at the manager level, monitor/track (periodically or on demand) computing resource usage (or key performance metrics with respect to, for example, network latency, a number of open ports, network port open/close integrity, data protection/encryption, data privacy/confidentiality, data integrity, data availability, be able to identify and protect against anticipated and/or non-anticipated security threats/breaches, etc.) per manager (e.g., a job manager, a task manager, etc.) to infer readiness of each manager; (vii) based on (vi), to identify (a) which task manager is healthy (e.g., be able to generate a response to a request) and (b) which task manager is unhealthy (e.g., an over-provisioned task manager, a task manager that is slowing down in terms of performance, etc.); (viii) based on (vii), manage health of a task manager by implementing a policy (e.g., to manage an aggregate workload across task managers, to manage SLA and QoS compliance as well as load balancing, etc.); (ix) identify health (e.g., a current status) of a task manager based on average, minimum, and maximum resource utilization values (of each task manager); (x) provide identified health of a task manager to other entities (e.g., administrators, users of the clients (e.g., 110A, 110B, etc.), etc.); (xi) in conjunction with the corresponding job manager(s), add/remove computing resources to a task manager so that the task manager may continue providing computer-implemented services to, for example, corresponding users; (xii) in conjunction with the corresponding job manager(s), schedule task managers on different computing devices based on workload and the available computing resources on each computing devices; and/or (xiii) store (temporarily or permanently) the aforementioned data and/or the output(s) of the above-discussed processes in a storage device (e.g., a database hosted by IN A (120A), 140, etc.).

In one or more embodiments, (a) to obtain data stream metrics and/or resource related metrics and (b) for troubleshooting and optimization of data stream processing pipelines, the orchestrator (127) may monitor the streaming storage system (125) and the stream processing system (102). In one or more embodiments, while monitoring, the orchestrator (127) may need to, for example (but not limited to): inventory one or more components of each system; obtain a type and a model of a component of a system; obtain a version of firmware and/or other code executing on a component (of a system); obtain other information regarding a hardware component and/or a software component of a system; obtain information specifying each component's interaction with another component of the system (100); infer actions being performed and computation power being consumed by each task manager; identify communications being sent or received by each task manager; based on the identified communications, determine utilization rates (e.g., including estimates, measurements, etc.) of one or more resources by a task manager; etc.

In one or more embodiments, information (e.g., data stream metrics, resource related metrics, etc.) may be obtained as they become available or by the orchestrator (127) polling the streaming storage system (125) and the stream processing system (102) (via one or more API calls) for newer information. For example, based on receiving an API call from the orchestrator, one or more managers of the stream processing system may allow the orchestrator to obtain newer information. If necessary, the information may be shared with a user/administrator via a GUI of a corresponding client (e.g., 110A).

In one or more embodiments, the aforementioned information may be obtained (or streamed) continuously (without affecting production workloads of the streaming storage system (125) and the stream processing system (102)), as they are generated, or they may be obtained in batches, for example, in scenarios where (i) the orchestrator (127) receives a failure score calculation request (e.g., a health check request), (ii) a corresponding job manager (e.g., 106A) accumulates the information and provides them to the orchestrator at fixed time intervals, or (iii) the corresponding job manager stores the information in its storage (or in an external entity) and notifies the orchestrator to access the information from its storage or from the external entity. In one or more embodiments, the information may be access-protected for the transmission from, for example, the job manager to the orchestrator, e.g., using encryption.

In one or more embodiments, if the models (e.g., ML models, reactive models, proactive models, end-to-end auto-scaling models, etc.) that are used by the orchestrator (127) are not operating properly (e.g., are not providing the above-discussed functionalities), the models may be re-trained using any form of training data and/or the models may be updated periodically as there are improvements in the models (e.g., the models are trained using more appropriate training data).

As used herein, "end-to-end auto-scaling" (or more specifically "end-to-end auto-scaling of data stream processing pipelines") refers to taking into account (i) the streaming storage system (125) that ingests and/or store stream data and (ii) the stream processing system (102) while making an auto-scaling decision with respect to, for example, the number of segment stores and/or task managers.

In one or more embodiments, in order to manage health of, at least, segment stores (e.g., 164, FIG. 1.2) and/or task managers (e.g., 108A, 108B, etc.), and resolve bottlenecks in data stream processing pipelines without affecting the operation of the streaming storage system (125) and the stream processing system (102), the orchestrator (127) may take one or more preventive (and proactive) actions. A preventive action may be, for example (but not limited to): in conjunction with corresponding job manager(s), performing workload redistribution among task managers (e.g., high-performance load balancing) to manage overall performance of the stream processing system); in conjunction with corresponding job manager(s), reducing the quantity of unnecessary REST API calls to prevent unnecessary memory utilization and to improve the likelihood that the unhealthy task managers are healthy again; in conjunction with corresponding job manager(s), modifying (e.g., adding, removing, etc.) computing resources allocated to a task manager to ensure highly available task managers; modifying a predetermined maximum RUV threshold (e.g., increasing a predetermined maximum CPU utilization value threshold from 70% to 85% so that Task Manager B may take more workloads); in conjunction with corresponding job manager (s), testing (in terms of resource utilization and workload assignment) a newer task manager that will be added into the stream processing system before causing an impact on the stream processing system; etc.

Further, in one or more embodiments, a job manager (e.g., 106A, 106B, etc.) may receive one or more composition requests (e.g., a task manager composition request) from the orchestrator (127). A composition request may indicate a desired outcome such as, for example, execution of one or more applications on a composed task manager, providing of one or more services (e.g., by a composed task manager), etc. The job manager may translate (using an intent based model) the composition request into corresponding quantities of computing resources necessary to be allocated (e.g., to a composed task manager) to satisfy the intent expressed in the composition request. Once the quantities of computing resources are obtained, the job manager may allocate computing resources available within the stream processing system (and/or external resources that are available for allocation) to generate the composed task manager (e.g., to satisfy composition requests).

In one or more embodiments, the job manager (e.g., 106A, 106B, etc.) may utilize an outcome based computing resource requirements lookup table to match an expressed intent to resources to be allocated to satisfy that intent. The outcome based computing resource requirements lookup table may specify the type, make, quantity, method of management, and/or other information regarding any number of computing resources that when aggregated will be able to satisfy a corresponding intent. The job manager may identify resources for allocation to satisfy composition requests via other methods without departing from the scope of the invention.

For example, a processor of a task manager (e.g., 108A, 108B, etc.) may provide telemetry data regarding computing resources of the task manager (e.g., to the job manager), may perform actions on behalf of the job manager to aggregate computing resources together, may organize the performance of duplicative workloads to improve the likelihood that workloads are completed, and/or may provide services that unify the operation of a composed task manager.

Additionally, the job manager (e.g., 106A, 106B, etc.) may instruct the processors (of one or more task managers) to manage hardware resources of their hardware resource sets in accordance with one or more models (e.g., data integrity, security, etc.). However, when the processors present these resources to their compute resource sets, the processors may present the resources as bare metal resources while managing them in more complex manners. By doing so, embodiments of the invention may provide a framework for unified security, manageability, resource management/composability, workload management, and/or distributed system management by use of processors.

As described above, composition requests may specify computing resource allocations using an intent based model (e.g., intent based requests received from the orchestrator (127)). For example, rather than specifying specific computing resources (or portions thereof) to be allocated to a particular compute resource set to obtain a composed task manager, a composition request may only specify that a composed task manager is to be instantiated having predetermined characteristics, that a composed task manager will perform certain workloads or execute certain applications, and/or that the composed task manager be able to perform one or more predetermined functionalities. In such a scenario, the job manager (e.g., 106A, 106B, etc.) may decide how to instantiate a composed task manager (e.g., which resources to allocate, how to allocate the resources (e.g., virtualization, emulation, redundant workload performance, data integrity models to employ, etc.), etc.).

In one or more embodiments, composition requests may specify computing resource allocations using an explicit model. For example, a composition request may specify (i) computing resources to be allocated, (ii) the manner of presentation of those resources (e.g., emulating a particular type of device using a virtualized resource vs. path through directly to a hardware component), and/or (iii) compute resource set(s) to which each of the allocated resources are to be presented. In addition to specifying computing resource allocations, a composition request may also specify, for example, applications to be executed by a composed task manager, security models to be employed by the composed task manager, communication models to be employed by the composed task manager, services to be provided by the composed task manager, user/entity access credentials for use of the composed task manager, and/or other information usable to place the composed task manager into a state where the composed task manager provides desired computer-implemented services.

In one or more embodiments, data stream metrics may include (or specify), for example (but not limited to): a product identifier of a client (e.g., 110A); a type of a client; a number of elastic data streams received by the streaming storage system (125); a number of segment stores being executed on the streaming storage system; a type of data being ingested by the streaming storage system; a degree of parallelism (with respect to elastic data streams (described below in reference to FIG. 1.2)) supported by the streaming storage system; information with respect to elastic data streams; cost of executing a segment store; segment store configuration information (e.g., a storage size of a segment container (e.g., 165A, FIG. 1.2); an access mode of a segment store, etc.); an identifier of a data item; a size of the data item; an identifier of a user who initiated a data stream (via a client); a user activity performed on a data item; historical sensor data/input (e.g., visual sensor data, audio sensor data, electromagnetic radiation sensor data, temperature sensor data, humidity sensor data, corrosion sensor data, etc., in the form of text, audio, video, touch, and/or motion) and its corresponding details; a cumulative history of user activity records obtained over a prolonged period of time; a number of the parallel stream segments; a type of OS used by the streaming storage system; a resource utilization value of a resource associated with a segment store; etc.

In one or more embodiments, resource related metrics may include (or specify), for example (but not limited to): a type of an asset (e.g., a workload, a file, a folder, etc.) utilized by a task manager (e.g., 108A); a product/hardware identifier of a client (e.g., 110A); a type of a client; a type of a file system; computing resource (e.g., CPU, GPU, DPU, memory, network, storage space, storage I/O, etc.) utilization data (e.g., data related to a task manager's maximum, minimum, and/or average CPU utilizations, an amount of memory utilized by a task manager, an amount of GPU utilized by a task manager, etc.) regarding the resources assigned to a task manager; one or more application logs; one or more system logs; a setting (and a version) of a mission critical application executing on a task manager; a product identifier of a task manager; a product configuration information associated with a task manager; a job detail (e.g., an amount of events read by multiple task managers at the same time); a type of a job (e.g., a data protection job, a data restoration job, a non-parallel processing job, a parallel processing job, etc.) that has been initiated; information associated with a hardware resource set of a task manager; a number of task managers; a number of job managers; a garbage collection setting of a task manager; cost of executing a task manager; a relationship between a number of parallel stream segments and a number of task managers (e.g., a one-to-one relationship, one-to-two relationship, one-to-four relationship, etc.); a backup history documentation of a workload; recently obtained customer/user information (e.g., records, credentials, etc.) of a user; a restore history documentation of a workload; storage size (or capacity) consumed on the long-term storage (140) by a related task manager; a completion timestamp encoding a date and/or time reflective of the successful completion of a workload; a time duration reflecting the length of time expended for executing and completing a workload; a deduplication ratio reflective of the deduplication efficiency of a workload; a backup retention period associated with a workload; a status of a job (e.g., how many jobs are still active, how many jobs are completed, etc.); a number of requests handled (in parallel) per minute (or per second, per hour, etc.) by a task manager; a number of errors encountered when handling a workload; health status of a task manager; health status of a job manager; a documentation that shows how a related task manager performs against an SLO and/or an SLA; a set of requests received by a task manager; a set of responses provided (by the task manager) to those requests; etc.

In one or more embodiments, information associated with a hardware resource set (e.g., including at least resource related parameters) may specify, for example (but not limited to): a configurable CPU option (e.g., a valid/legitimate vCPU count per task manager option), a configurable network resource option (e.g., enabling/disabling single-root input/output virtualization (SR-IOV) for specific task managers), a configurable memory option (e.g., maximum and minimum memory per task manager), a configurable GPU option (e.g., allowable scheduling policy and/or virtual GPU (vGPU) count combinations per task manager), a configurable DPU option (e.g., legitimacy of disabling inter-integrated circuit (I2C) for various task managers), a configurable storage space option (e.g., a list of disk cloning technologies across all task managers), a configurable storage I/O option (e.g., a list of possible file system block sizes across all target file systems), a user type (e.g., a knowledge worker, a task worker with relatively low-end compute requirements, a high-end user that requires a rich multimedia experience, etc.), a network resource related template (e.g., a 10 GB/s BW with 20 ms latency QoS template), a DPU related template (e.g., a 1 GB/s BW vDPU with 1 GB vDPU frame buffer template), a GPU related template (e.g., a depth-first vGPU with 1 GB vGPU frame buffer template), a storage space related template (e.g., a 40 GB SSD storage template), a CPU related template (e.g., a 1 vCPU with 4 cores template), a memory resource related template (e.g., an 8 GB DRAM template), a vCPU count per task manager, a virtual NIC (vNIC) count per task manager, a wake on LAN support configuration (e.g., supported/enabled, not supported/disabled, etc.), a vGPU count per task manager, a type of a vGPU scheduling policy (e.g., a "fixed share" vGPU scheduling policy), a storage mode configuration (e.g., an enabled high-performance storage array mode), etc.

In one or more embodiments, the orchestrator (127) may be implemented as a computing device (e.g., 900, FIG. 9). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the orchestrator described throughout the application.

Alternatively, in one or more embodiments, similar to a client (e.g., 110A, 110B, etc.), the orchestrator may also be implemented as a logical device.

Further, the orchestrator (127) may store (temporarily or permanently), at least, the resource related metrics, data stream metrics, and/or one or more policies in a fault-tolerant database (e.g., a data domain hosted by IN A (120A) or external to IN A that stores unstructured and/or structured data) to enable administration unification. The orchestrator may utilize the aforementioned data to, for example, decide whether computing resources should be added to or removed from one or more task managers (e.g., 108A, 108B, etc.). Consequently, computing resources may be dynamically re-provisioned over to meet changing workloads imposed on the task managers.

In one or more embodiments, policies may include (or specify), for example (but not limited to): an attribute of an asset; an access control list of an asset; an SLA that needs to be implemented by a job manager (e.g., an agreement that indicates a period of time required to retain data); an SLO that needs to be implemented by a job manager; an alert (e.g., a predictive alert, a proactive alert, a technical alert, etc.) that will be triggered for a task manager (e.g., a medium-level of CPU overheating is detected, a recommended maximum GPU operating temperature is exceeded, etc.); an important keyword (e.g., recommended maximum CPU operating temperature is 75° C.) related to a hardware component of a task manager; a recovery catalog (e.g., a database object that stores metadata of a backup operation); an archive log asset (e.g., a database object that stores historical changes made to database data such as one or more redo entries); a set of data protection policies (e.g., defined by a vendor); a user-defined scaling policy that specifies a one-to-one relationship between a number of parallel stream segments and a number of task managers; the best practice recommended by a vendor for a task manager (e.g., a task manager should not execute more than five workloads in parallel); a predetermined write latency threshold value; a user-defined scaling policy that specifies generation of an additional task manager when a number of events per second written in a stream segment (managed by a segment store) exceeds a predetermined threshold value; a predetermined maximum RUV threshold value (associated with a resource); performance requirements (e.g., latency requirements, streaming requirements, priority requirements, etc.) need to be followed (by a task manager) while backing up data; cost associated to protect data (e.g., cloud cost versus on-premise cost); a cloud disaster recovery policy that is configured to recover a job manager that is utilized by a user; a configuration setting of the cloud disaster recovery policy; an asset sensitivity/criticality threshold that needs to be applied for all outgoing network traffic; a request (e.g., received from a user) decryption rule; a request authentication rule (which may be utilized by a job manager (e.g., 106A) to validate a request); a type of an allowable network communication/protocol between an entity and components of the stream processing system (102); a smart contract that defines under what conditions a request should be granted; a smart contract that defines under what conditions data a request should be transferred to a task manager; a set of rules for detecting and blocking illegitimate requests and application-based attacks; a set of rules to protect components of the stream processing system against various classes and types of Internet-based vulnerabilities; a user-defined scaling policy that specifies generation of an additional task manager when a RUV of a resource (associated with a task manager) exceeds a predetermined maximum RUV threshold value; a user-defined scaling policy that specifies generation of an additional segment store when a 95th percentile of an end-to-end write latency exceeds 100 ms; etc.

In one or more embodiments, the database may be a fully managed cloud database (or any logical container) that acts as a shared storage or memory (simply storage/memory) resource that is functional to store unstructured and/or structured data. Further, the database may also occupy a portion of a physical storage/memory device or, alternatively, may span across multiple physical and persistent (i.e., non-volatile) storage/memory devices (which may or may not be of the same type).

In one or more embodiments, the unstructured and/or structured data may be updated (automatically) by third party systems (e.g., platforms, marketplaces, etc.) (provided by vendors) and/or by administrators based on, for example, newer (e.g., updated) versions of SLAs being available. The unstructured and/or structured data may also be updated when, for example (but not limited to): a data backup operation is initiated, a set of jobs is received, a data restore operation is initiated, an ongoing data backup operation is fully completed, a state of a task manager is changed, etc.

While the database has been illustrated and described as including a limited number and type of data, the database may store additional, less, and/or different data without departing from the scope of the invention. One of ordinary skill will appreciate that the database may perform other functionalities without departing from the scope of the invention.

While FIG. 1.1 shows a configuration of components, other system configurations may be used without departing from the scope of the invention.

Turning now to FIG. 1.2, FIG. 1.2 shows a diagram/architecture of the streaming storage system (125) in accordance with one or more embodiments of the invention. The streaming storage system (125) (e.g., Dell Pravega or simply "Pravega") includes a controller (162), a logger (166) (e.g., a bookkeeper service), a segment store (SS) (164), and a consensus service (168) (e.g., a zookeeper service). The streaming storage system (125) may include additional, fewer, and/or different components without departing from the scope of the invention. For example, based on the amount of available computing resources, the streaming storage system (125) may host multiple controllers, segment containers (SCs) (e.g., 165A, 165B, etc.), and/or SSs executing contemporaneously, e.g., distributed across multiple servers, VMs, or containers, for scalability and fault tolerance. Each component may be operably connected to any of the other component via any combination of wired and/or wireless connections. Each component illustrated in FIG. 1.2 is discussed below.

The embodiment shown in FIG. 1.2 may show a scenario in which (i) one or more SCs (e.g., 165A, 165B, etc.) are distributed across the SS (164) and (ii) the streaming storage system (125) is an independent system (e.g., meaning that the streaming storage system may customize the resource usage of the SS independently, in an isolated manner).

In one or more embodiments, the streaming storage system (125) allows users (via clients (e.g., Client A (110A))) to ingest data and execute real-time analytics/processing on that data (while (i) guaranteeing data consistency and durability (e.g., once acknowledged, data is never lost), and (ii) providing a storage abstraction for continuous and unbounded data). With the help of the SS (164), the data may be progressively moved to the long-term storage (140) so that users may have access to the data to perform, for example, large-scale batch analytics (e.g., on a cloud (with more resources)), live and historical data playback, etc. Users may define clusters that execute a subset of assigned SCs across the system (e.g., 100, FIG. 1.1) so that different subsets of SCs may be executed on independent clusters (which may be customized in terms of instances and resources per-instance) to adapt different kinds of workloads and/or hardware components.

In one or more embodiments, the controller (162) may represent a "control plane" and the SS (164) may represent a "data plane". The SS (164) may execute/host, at least, SC A (165A) and SC (165B) (as "active" SCs, so they may serve write/read operations (e.g., low-latency durable atomic writes)), in which an SC is a unit of parallelism in Pravega (or a unit of work of a SS) and is responsible for executing any storage or metadata operations against the segments (described below) allocated in it. Due to the design characteristics of Pravega (e.g., with the help of the integrated storage tiering mechanism of Pravega), the SS (164) may store data to the long-term storage (140), in which the tiering storage may be useful to provide instant access to recent stream data. Although not shown, the streaming storage system may include one or more processors, buses, and/or other components without departing form the scope of the invention.

In one or more embodiments, an SC may represent how Pravega partitions a workload (e.g., a logical partition of the workload at the data plane) in order to host segments of streams (e.g., elastic, up and only unbounded infinite number of streams). Once (automatically) initialized/initiated, an SC may keep executing on its corresponding SS (e.g., a physical component) to perform one or more operations, where, for example, Client A (110A) may not be aware of what the location of an SC in Pravega (e.g., in case Client A wants to generate a new stream with a segment).

In one or more embodiments, depending on resource capabilities (e.g., resource related parameters) of the streaming storage system (125) (which may be customized over time), the SS (164) (and the SCs hosted by that SS) may provide different functionalities (e.g., providing a better performance). For example, a resource related parameter may include (or specify), for example (but not limited to): a configurable CPU option (e.g., a valid/legitimate virtual CPU count per SS), a configurable memory option (e.g., maximum and minimum memory per SS), a configurable DPU option (e.g., legitimacy of disabling I2C for different SSs), a vCPU count per SS, an SS IOMMU configuration (e.g., enabled, disabled, etc.), vGPU count per SS, number of SCs available to perform an operation, etc. Additional details of resource related parameters are described above in reference to FIG. 1.1.

In one or more embodiments, the control plane may include functionality to, e.g.,: (i) in conjunction with the data plane, generate, alter, and/or delete data streams (e.g., index streams (which are useful to enforce retention), byte streams (which are useful to access data randomly at any byte offset), event streams (which are useful to allow parallel writes/reads), etc.); (ii) retrieve information about streams; and/or (iii) monitor health of a Pravega cluster (described below) by gathering metrics (e.g., data stream metrics). Further, the SS (164) may provide an API to read/write data in data streams.

In one or more embodiments, a stream (described below) may be partitioned/decomposed into stream segments (or simply "segments"). A stream may have one or more segments (where each segment may be stored in a combination of a durable log and long-term storage), in which data/event written into the stream may be written into exactly one of the segments based on the event's routing key (e.g., "writer-.writeEvent(routingkey, message)"). In one or more embodiments, writers (e.g., of Client A (110A)) may use routing keys (e.g., user identifier, timestamp, machine identifier, etc., to determine a target segment for a stream write operation) so that data is grouped together.

In one or more embodiments, based on the inherent capabilities of the streaming storage system (125) (e.g., Pravega), data streams may have multiple open segments in parallel (e.g., enabling the data stream parallelism), both for ingesting and consuming data. The number of parallel stream segments in a stream may automatically grow and/or shrink over time based on the I/O load (or fluctuations) the stream receives, so that the parallelism of the stream may be modified based on a number of functions to be executed, if needed. Further, by means of having (i) auto-scaling policies and (ii) metrics for the orchestrator (e.g., 127, FIG. 1.1) and with the help of the data stream parallelism, the orchestrator may enable storage-compute elasticity in data stream processing pipelines, and allow dynamic scaling compute and storage services independently (e.g., auto-scaling task managers and SS independently to perform stream processing jobs, exploiting information with respect to data stream parallelism for auto-scaling a stream processing job, etc.).

As described above, a data stream with one or more segments may support parallelism of data writes, in which multiple writers (or multiple writer components) writing data to different segments may exploit/involve one or more servers hosted in a Pravega cluster (e.g., one or more servers, the controller (162), and the SS (164) may collectively be referred to as a "Pravega cluster", in which the Pravega cluster may be coordinated to execute Pravega). In one or more embodiments, a consistent hashing scheme may be used to assign incoming events to their associated segments (such that each event is mapped to only one of the segments based on "user-provided" or "event" routing key), in which event routing keys may be hashed to form "key space" and the key space may be divided into a number of partitions, corresponding to the number of segments. Additionally, each segment may be associated with only one instance of SS (e.g., the SS (164)).

In one or more embodiments, from the perspective of a reader component (e.g., Client A (110A) may include a writer component and a reader component), the number of segments may represent the maximum degree of read parallelism possible (e.g., all the events from a set of streams will be read by only one reader in a "reader group (RG)". If a stream has N segments, then an RG with N reader components may consume from the stream in parallel (e.g., for any RG reading a stream, each segment may be assigned to one reader component in that RG). In one or more embodiments, increasing the number of segments may increase the number of readers in an RG to increase the scale of processing the data from that stream, whereas, as the number of segments decreases, the number of readers may be reduced.

In one or more embodiments, a reader component may read from a stream either at the tail of the stream or at any part of the stream's historical data. Unlike log-based systems that use the same kind of storage for tail reads/writes as well as reads to historical data, a tail of a stream may be kept in a durable log, where write operations may be implemented by the logger (166) as described herein. In some cases (e.g., when a failure has occurred and the system is being recovered), the logger may serve read operations.

In one or more embodiments, the streaming storage system (125) may implement exactly-once semantics (or "exactly once delivery semantics"), which means data is delivered and processed exactly-once (with exact ordering guarantees), despite failures in, for example, Client A (110A), servers, serverless functions (e.g., a mapper function, a reducer function, etc.), stateful operators, and/or the network (e.g., 130, FIG. 1.1). To achieve exactly-once semantics, streams may be durable, ordered, consistent, and/or transactional (e.g., embodiments of the invention may enable durable storage of streaming data with strong consistency, ordering guarantees, and high-performance).

As used herein, "ordering" may mean that data is read by reader components in the order it is written. In one or more embodiments, data may be written along with an application-defined routing key, in which the ordering guarantee may be made in terms of routing keys (e.g., a write order may be preserved by a routing key, which may facilitate write parallelism). For example, two pieces of data with the same routing key may be read by a reader in the order they were written. In one or more embodiments, Pravega (more specifically, the SS (164)) may enable an ordering guarantee to allow data reads to be replayed (e.g., when applications fail) and the results of replaying the reads (or the read processes) may be the same.

As used herein, “consistency” may mean that reader components read the same ordered view of data for a given routing key, even in the case of a failure (without missing any data/event). In one or more embodiments, Pravega (more specifically, the SS (164)) may perform idempotent writing processes, where rewrites performed as a result of failure recovery may not result in data duplication (e.g., a write process may be performed without suffering from the possibility of data duplication (and storage overhead) on reconnections).

In one or more embodiments, the SS (164) may automatically (e.g., elastically and independently) scale individual data streams to accommodate changes in a data ingestion rate. The SS may enable shrinking of write latency to ms, and may seamlessly handle high-throughput reads/writes from Client A (110A), making the SS ideal for IoT and other time-sensitive implementations. For example, consider a scenario where an IoT application receives information from hundreds of devices feeding thousands of data streams. In this scenario, the IoT application processes those streams to derive a business value from all that raw data (e.g., predicting device failures, optimizing service delivery through those devices, tailoring a user's experience when interacting with those devices, etc.). As indicated, building such an application at scale is difficult without having the components be able to scale automatically as the rate of data increases and decreases.

In one or more embodiments, a data stream may be configured to grow the number of segments as more data is written to the stream, and to shrink when data volume drops off. In one or more embodiments, growing and shrinking a stream may be performed based on a stream's SLO (e.g., to match the behavior of data input). For example, the SS (164) may enable monitoring a rate of data ingest/input to a stream and use the SLO to add or remove segments from the stream. In one or more embodiments, (i) segments may be added by splitting a segment/shard/partition of a stream (e.g., scaling may cause an existing segment, stored at the related data storage thus far, to be split into plural segments; scaling may cause an existing event, stored at the corresponding data storage thus far, to be split into plural events; etc.), (ii) segments may be removed by merging two segments (e.g., scaling may cause multiple existing segments to be merged into a new segment; scaling may cause multiple existing events to be merged into a new event; etc.), and/or (iii) the number of segments may vary over time (e.g., to deal with a potentially large amount of information in a data stream). Further, a configuration of a writer component may not change when segments are split or merged, and a reader component may be notified via a stream protocol when segments are split or merged to enable reader parallelism.

Referring to FIG. 1.1, the stream processing system (102) includes one or more real-time stream processing engines (e.g., task managers (e.g., 108A, 108B, etc.)) that provides unified and real-time analytics (see e.g., FIGS. 8.1-8.3), while (i) achieving high-throughput and low-latency stream data processing, and (ii) supporting complex event processing and state management. In one or more embodiments, the stream processing system further includes (i) one or more stateful operators (e.g., a mapper operator, a reducer operator, etc.) that are connected with one or more data streams, (ii) a DataSet API for batch processing of finite datasets, and (iii) a DataStream API for stream processing of unbounded datasets.

Further, both the streaming storage system (125) and the stream processing system (e.g., 102, FIG. 1.1) treat a data stream as a first-class primitive, which makes them useful to jointly construct data stream processing pipelines. In order to enable the streaming storage system to be a data source/sink for the stream processing system (so that, for example, one or more task managers (e.g., 108A, 108B, etc.) may read/write data from/to the SS (164)), each of the task managers and/or job managers may execute a connector (e.g., a physical device (i.e., hardware), a logical intelligence (i.e., software), or a combination thereof). For example, a connector of a task manager provides seamless integration with the components (e.g., operators) of the task manager, thereby ensuring parallel data reads/writes, checkpointing, and guaranteeing exactly-once processing with the streaming storage system.

As discussed above, one or more readers are organized into a RG and the streaming storage system (125) guarantees that each event written to a data stream is sent exactly one reader with the RG. Further, different RGs may simultaneously read from any given data stream, in which each reader in a RG is assigned to zero or more SSs. This means that a reader that is assigned to a SS is the only reader (within its RG) that reads events from that SS. Readers within a RG may dynamically re-balance the assignment of segments, for example, upon a membership change (e.g., having more or less readers in a RG over time) or when the number of parallel SSs changes because of stream auto-scaling. With the help of the DataStream API (which is provided by a connector of a task manager), the task manager may read data streams (from the streaming storage system) to perform one or more streaming jobs.

Further, the connector of the task manager also ensures a failure recovery for streaming jobs. More specifically, (i) the stream processing system (e.g., 102, FIG. 1.1) implements asynchronous periodic checkpoint concept (e.g., via the Chandy-Lamport model) to make, for example, task manager state and stream positions recoverable, and (ii) the streaming storage system (125) implements its own checkpoint concept that applies, for example, a RG that reads from a data stream (where a RG checkpoint generates a consistent reference for a position in the stream that an application can roll back to). In one or more embodiments, the connector has a functionality to combine both checkpoint concepts to recover a stream processing job (e.g., to guarantee failure recovery).

In one or more embodiments, a connector of a task manager (e.g., 108A, FIG. 1.1) allows stream processing jobs to write their results to the SS (164) in a consistent, durable, and ordered manner. When used as a sink for stream processing jobs, the connector also provides exactly-once semantics, in which each incoming event is guaranteed to be effectively processed (e.g., read or written) only once. To be able to provide exactly-once semantics, the connector implements one or more retries, which means that output of a stream processing job may be partially written. To this end, the streaming storage system (125) (as a data sink) may need to support commits and rollbacks (e.g., to prevent duplicate data reading and to enable recovery in case of a failure), in which Pravega already supports transactional writes (which satisfies the requirement of committing and rolling back).

In one or more embodiments, Pravega transactions (i) allow applications to prepare and then commit a set of events that may be written atomically to a data stream and/or (ii)

guarantee that either all transaction events are eventually available for reading (or none of the transaction events are available for reading). Further, Pravega transactions enable a stream processing job to align a checkpointing process with committing an output, which enables achieving exactly-once processing pipelines (with the coordination (in terms of supporting commits and rollbacks) between the streaming storage system (125) and the stream processing system (e.g., 102, FIG. 1.1) via a two-phase commit protocol).

In one or more embodiments, Client A (110A) may send metadata requests to the controller (162) and may send data requests (e.g., write requests, read requests, create a stream, delete the stream, get the segments, etc.) to the SS (164). With respect to a "write path" (which is primarily driven by a sequential write performance of the logger (166)), the writer component of Client A (110A) may first communicate with the controller (162) to perform a write operation (e.g., appending events/data) and to infer which SS it supposed to connect to. Based on that, the writer component may connect to the SS (164) to start appending data. Thereafter, the SS (164) (more specifically, SCs hosted by the SS) may first write data (synchronously) to the logger (166) (e.g., the "durable log" of Pravega (which typically executes within the Pravega cluster), Apache Bookkeeper, a distributed write ahead log, etc.) to achieve data durability (e.g., in the presence of small write operations) and low-latency (e.g., <10 ms) before acknowledging the writer component on every data written (so that data may not be lost as data is saved in protected, persistent/temporary storage before the write operation is acknowledged).

Once acknowledged, in an offline process, the SS (164) may group the data (written to the logger (166) into larger chunks and asynchronously move the larger chunks to the long-term storage (140) (e.g., the "long-term storage" of Pravega, pluggable storage, AWS S3, Apache HDFS, Dell Isilon, Dell ECS, object storage, block storage, file system storage, etc.) for high read/write throughput (e.g., to perform batch analytics) (as indicated, Client A (110A) may not directly write to long-term storage) and for permanent data storage. For example, Client A may send a data request for storing and processing video data from a surgery in real-time (e.g., performing computations (or real-time analytics) on the video data captured by surgery cameras for providing augmented reality capabilities on the video data to help surgeons, where SC A (165A) may be used for this purpose), and eventually, this data may need to be available (or permanently stored) on a larger IT facility that hosts enough storage/memory and compute resources (e.g., for executing batch analytics on historical video data to train ML models, where the video data may be asynchronously available in the long-term storage).

Further, with respect to a "read path" (which is isolated from the write path), the reader component of Client A (110A) may first communicate with the controller (162) to perform a read operation and to infer which SS it supposed to connect to (e.g., via its memory cache, the SS (164) may indicate where it keeps the data such that the SS may serve tail of data from the cache). For example, if the data is not cached (e.g., historical data), the SS may pull data from the long-term storage (140) so that the reader component performs the read operation (as indicated, the SS may not use the logger (166) to serve a read request of the reader component, where the data in the logger may be used for recovery purposes when necessary).

In one or more embodiments, once data is (and/or will be) provided by Client A (110A) to the SS (164), users may desire access to the data managed by the SS. To facilitate provisioning of access to the data, the SS may manage one or more data structures (in conjunction with the logger (166)), such as block chains, that include information, e.g.,: (i) related to data ownership, (ii) related to the data that is managed, (iii) related to users (e.g., data owners), and/or (iv) related to how users may access the stored data. In one or more embodiments, by providing data management services and/or operational management services (in conjunction with the logger) to the users and/or other entities, the SS may enable any number of entities to access data. As part of providing the data management services, the SS may provide (in conjunction with the logger and/or the long-term storage (140)) a secure method for storing and accessing data. By doing so, access to data in the logger may be provided securely while facilitating provisioning of access to the data.

The data management services and/or operational management services provided by the SS (164) (through, for example, its SCs) may include, e.g.,: (i) obtaining data requests and/or data from Client A (110A) (where, for example, Client A performs a data write operation through a communication channel); (ii) organizing and/or writing/storing the "obtained" data (and metadata regarding the data) to the logger (166) to durably store the data; (iii) generating derived data based on the obtained data (e.g., grouping the data into larger chunks by employing a set of linear, non-linear, and/or ML models), (iv) providing/moving the obtained data, derived data, and/or metadata associated with both data to the long-term storage (140); (v) managing when, how, and/or what data Client A may provide; (vi) temporarily storing the obtained data in its cache for serving that data to reader components; and/or (vii) queueing one or more data requests.

In one or more embodiments, as being part of the tiered storage streaming system (e.g., the durable log), the logger (166) may provide short-term, low-latency data storage/protection while preserving/guaranteeing the durability and consistency of data written to streams. In some embodiments, the logger may exist/execute within the Pravega cluster. As discussed above, the SS (164) may enable low-latency, fast, and durable write operations (e.g., data is replicated and persisted to disk before being acknowledged) to return an acknowledgement to a writer component (e.g., of Client A (110A)), and these operations may be optimized (in terms of I/O throughput) with the help of the logger.

In one or more embodiments, to add further efficiency, write operations to the logger (166) may involve data from multiple segments, so the cost of persisting data to disk may be amortized over several write operations. The logger may persist the most recently written stream data (to make sure reading from the tail of a stream can be performed as fast as possible), and as data in the logger ages, the data may be moved to the long-term storage (140) (e.g., a tail of a segment may be stored in a durable log providing low-latency reads/writes, whereas the rest of the segment may be stored in long-term storage providing high-throughput read access with near-infinite scale and low-cost). Further, the Pravega cluster may use the logger as a coordination mechanism for its components, where the logger may rely on the consensus service (168).

One of ordinary skill will appreciate that the logger (166) may perform other functionalities without departing from the scope of the invention. The logger may be implemented using hardware, software, or any combination thereof.

In one or more embodiments, in case of reads, SC A (165A) may have a "read index" that tracks the data read for the related segments, as well what fraction of that data is stored in cache. If a read process (e.g., initiated upon receiving a read request) requests data for a segment that is not cached, the read index may trigger a read process against the long-term storage (140) to retrieve that data, storing it in the cache, in order to serve Client A (110A).

As used herein, data may refer to a "stream data (or a "stream")" that is a continuous (or continuously generated), unbounded (in size), append-only (e.g., data in a stream cannot be modified but may be truncated, meaning that segments are indivisible units that form the stream), lightweight (e.g., as a file), and durable sequence of bytes (e.g., a continuous data flow/structure that may include data, metadata, and/or the like; a collection of data records called "events", in which there may not be a limit on how many events can be in a stream or how many total bytes are stored in a stream; etc.) generated (in parallel) by one or more data sources (e.g., 110A, 110B, IoT sensors, etc.). In one or more embodiments, by using append-only log data structures (which are useful for serverless computing frameworks while supporting real-time and historical data access), the SS (164) may enable rapid ingestion of information into durable storage (e.g., the logger (166)) and support a large variety of application use cases (e.g., publish/subscribe messaging, NoSQL databases, event-oriented applications, etc.). Further, a writer component may keep inserting events at one end of a stream and a reader component may keep reading the latest ones from there or for historical reads, the reader component may target specific offsets and keep reading from there.

As used herein, an event may be a collection of bytes within a stream (or a contiguous set of related extents of unbounded, continuously generated data) (e.g., a small number of bytes including a temperature reading from an IoT sensor composed of a timestamp, a metric identifier, and a value; web data associated with a user click on a website; a timestamped readout from one sensor of a sensor array; etc.). Said another way, events (which are atomic) may be appended to segments of a data stream (e.g., a stream of bytes), where segments are the unit of storage of the data stream (e.g., a data stream may be comprised of one or more segments, where (i) each segment may include one or more events (where a segment may not store events directly, the segment may store the append-only sequence of bytes of the events) and (ii) events may be appended to segments by serializing them into bytes, where once written, that sequence of bytes is immutable). In one or more embodiments, events may be stored along a data stream in parallel to one another and/or in succession to one another (where segments may provide parallelism). That is, one or more events may have data occurring in parallel, or having occurred in parallel. Further, one or more events may sequentially follow one or more other events, such as having data that occurs after one or more other events, or has occurred after data from one or more other events.

In one or more embodiments, the number of segments for appending and/or truncating (e.g., the oldest data from a stream without compromising with the data format) may vary over a respective unit axis of a data stream. It will be appreciated that a data stream may be represented relative to a time axis. That is, data and/or events may be written to and/or appended to a stream continuously, such as in a sequence or in an order. Likewise, such data may be reviewed and/or analyzed by a user in a sequence or in an order (e.g., a data stream may be arranged based upon a predecessor-successor order along the data stream).

Sources of data written, posted, and/or otherwise appended to a stream may include, for example (but not limited to): online shopping applications, social network applications (e.g., producing a stream of user events such as status updates, online transactions, etc.), IoT sensors, video surveillance cameras, drone images, autonomous vehicles, servers (e.g., producing a stream of telemetry information such as CPU utilization, memory utilization, etc.), etc. The data from streams (and thus from the various events appended to the streams) may be consumed, by ingesting, reading, analyzing, and/or otherwise employing in various ways (e.g., by reacting to recent events to analyze historical stream data).

In one or more embodiments, an event may have a routing key, which may be a string that allows Pravega and/or administrators to determine which events are related (and/or which events may be grouped) (e.g., when working with data streams having parallel segments, applications requiring total order of events are expected to use routing keys for writing data). A routing key may be derived from data, or it may be an artificial string (e.g., a universally unique identifier) or a monotonically increasing number. For example, a routing key may be a timestamp (to group events together by time), or an IoT sensor identifier (to group events by a machine). In one or more embodiments, a routing key may be useful to define precise read/write semantics. For example, (i) events with the same routing key may be consumed in the order they were written and (ii) events with different routing keys sent to a specific reader will always be processed in the same order even if that reader backs up and re-reads them.

As discussed above, Pravega (e.g., an open-source, distributed and tiered streaming storage system providing a cloud-native streaming infrastructure (i) that is formed by controller instances and SS instances, (ii) that eventually stores stream data in a long-term storage (e.g., 140), (iii) that enables auto-scaling of streams (where a degree of parallelism may change dynamically in order to react workload changes) and its connection with serverless computing, and (iv) that supports both a byte stream (allowing data to be access randomly by any byte offset) and an event stream (allowing parallel writes/reads)) may store and manage/serve data streams, in which the "stream" abstraction in Pravega is a first-class primitive for storing continuous and unbounded data. A data stream in Pravega guarantees strong consistency and achieves good performance (with respect to data storage and management), and may be combined with one or more stream processing engines (e.g., Apache Flink, task managers, etc.) to initiate streaming applications.

In one or more embodiments, Client A (110A) may concurrently have dynamic write/read access to a stream where other clients (using the streaming storage system (125)) may be aware of all changes being made to the stream. The SS (164) may track data that has been written to the stream. Client A may update the stream by sending a request to the SS that includes the update and a total length of the stream that was written at the time of a last read update by Client A. If the total length of the stream received from Client A matches the actual length of the stream maintained by the SS, the SS may update the stream. If not, a failure message may be sent to Client A and Client A may process more reads to the stream before making another attempt to update the stream.

In one or more embodiments, Client A (110A) may provide a client library that may implement an API for the writer and reader components to use (where an application may use the API to read and write data from and to the storage system). The client library may encapsulate a protocol used for a communication between Client A and Pravega (e.g., the controller (162), the SS (164), etc.). As discussed above, (i) a writer component may be an application that generates events/data and writes them into a stream, in which events may be written by appending to the tail (e.g., front) of the stream; (ii) a reader component may be an application that reads events from a stream, in which the reader component may read from any point in the stream (e.g., a reader component may be reading events from a tail of a stream); and (iii) events may be delivered to a reader component as quickly as possible (e.g., events may be delivered to a reader component within tens of ms after they were written).

In one or more embodiments, segments may be illustrated as "Sn" with "n" being, for example, one through ten. A low number n indicates a segment location closer to a stream head and a high number n indicates a segment location closer to a stream tail. In general, a stream head refers to the smallest offsets of events that have no predecessor (e.g., the beginning of a stream, the oldest data, etc.). Such events may have no predecessor because either such events are the first events written to a stream or their predecessors have been truncated. Likewise, a stream tail refers to the highest offsets of events of an open stream that has no successor (e.g., the most recently written events and/or last events, the end of a stream where new events are appended, etc.). In one or more embodiments, a segment may be (i) an "open segment" indicating that a writer component may write data to that segment and a reader component may consume that data at a later point-in-time, and (ii) a "sealed/immutable segment" indicating that the segment is read-only (e.g., which may not be appended).

In one or more embodiments, a reader component may read from earlier parts (or at an arbitrary position) of a stream (referred to as "catch-up reads", where catch-up read data may be cached on demand) and a "position object (or simply a "position")" may represent a point in the stream that the reader component is currently located.

As used herein, a "position" may be used as a recovery mechanism, in which an application (of Client A (110A)) that persist the last position of a "failed" reader component that has successfully processed may use that position to initialize a replacement reader to pick up where the failed reader left off. In this manner, the application may provide exactly-once semantics (e.g., exactly-once event processing) in the case of a reader component failure.

In one or more embodiments, multiple reader components may be organized into one or more RGs, in which an RG may be a named collection of readers that together (e.g., in parallel, simultaneously, etc.) read events from a given stream. Each event published into a stream may be guaranteed to be sent to one reader component within an RG. In one or more embodiments, an RG may be a "composite RG" or a "distributed RG", where the distributed RG may allow a distributed application to read and process data in parallel, such that a massive amount of data may be consumed by a coordinated fleet of reader components in that RG. A reader (or a reader component) in an RG may be assigned zero or more stream segments from which to read (e.g., a segment is assigned to one reader in the RG, which gives the "one segment to one reader" exclusive access), in which the number of stream segments may be balanced to which the reader is assigned. For example, the reader may read from two stream segments while another reader in the RG may only read one stream segment.

In one or more embodiments, reader components may be added to an RG, or reader components fail and may be removed from the RG, and a number of segments in a stream may determine the upper bound of "read" parallelism of readers/reader components within the RG. Further, an application (of Client A (110A)) may be made aware of changes in segments (via the SS (164)). For example, the application may react to changes in the number of segments in a stream (e.g., by adjusting the number of readers in an associated RG) to maintain maximum read parallelism if resources allow.

In one or more embodiments, events may be appended to a stream individually, or may be appended as a stream transaction (no size limit), which is supported by the streaming storage system (125). As used herein, a "transaction" refers to a group/set of multiple events (e.g., a writer component may batch up a bunch of events in the form of a transaction and commit them as a unit into a stream). For example, when the controller (162) invokes committing a transaction (e.g., as a unit into a stream), the group of events included in the transaction may be written (via the writer component) to a stream as a whole (where the transaction may span multiple segments of the stream) or may be abandoned/discarded as a whole (e.g., if the writer component fails). With the use of transactions, a writer component may persist data at a point-in-time, and later decide whether the data should be appended to a stream or abandoned. In one or more embodiments, a transaction may be implemented similar to a stream, in which the transaction may be associated with multiple segments and when an event is published into the transaction, (i) the event itself is appended to a segment of the transaction (where data written to the transaction is just as durable as data written directly to a stream) and (ii) the event may not be visible to a reader component until that transaction is committed. Further, an application may continuously produce results of a data processing operation and use the transaction to durably accumulate the results of the operation.

In one or more embodiments, as being a stateless component, the controller (162) may (further) include functionality to, e.g.,: (i) manage the lifecycle of a stream and/or transactions, in which the lifecycle of the stream includes features such as generation, scaling, modification, truncation, and/or deletion of a stream (in conjunction with the SS (164)); (ii) manage/enforce a retention policy for a stream that specifies how the lifecycle features are implemented (e.g., requiring periodic truncation (described below) based on size and time bounds); (iii) manage transactions (e.g., generating transactions (e.g., generating transaction segments), committing transactions (e.g., merging transaction segments), aborting transactions (e.g., dropping a transaction segment), etc.); (iv) be dependent on stateful components (e.g., the consensus service (168), the logger (166) (for the write ahead log functionalities)); (v) manage (and authenticate) metadata requests (e.g., get information about a segment, get information about a stream, etc.) received from Client A (110A) (e.g., manage stream metadata); (vi) be responsible for distribution/assignment of SCs into one or more SSs executing on the streaming storage system (125) (e.g., if a new SS (or a new SS instance) is added to the streaming storage system, the controller may perform a reassignment of SCs along all existing SSs to balance/split the workload); (vii) be responsible for making sense of segments; (viii) manage/enforce an auto-scaling policy for a stream that allows the streaming storage system to automatically change the segment parallelism of a data stream based on an ingestion workload (e.g., events/bytes per second); and/or (ix) manage a control plane of the streaming storage system.

In one or more embodiments, although data streams are typically unbounded, truncating them may be desirable in practical real-world scenarios to manage the amount of storage space the data of a stream utilizes relative to a stream storage system. This may particularly be the case where storage capacity is limited. Another reason for truncating data streams may be regulatory compliance, which may dictate an amount of time an application retains data.

In one or more embodiments, a stream may dynamically change over time and, thus, metadata of that stream may change over time as well. Metadata of a stream may include (or specify), for example (but not limited to): configuration information of a segment, history of a segment (which may grow over time), one or more scopes, transaction metadata, a logical structure of segments that form a stream, etc. The controller (162) may store metadata of streams (which may enable exactly-once semantics) in a table segment, which may include an index (e.g., a B+ tree index) built on segment attributes (e.g., key-value pairs associated to segments). In one or more embodiments, the corresponding "stream metadata" may further include, for example, a size of a data chunk stored in long-term storage (140) and an order of data in that data chunk (for reading purposes and/or for batch analytics purposes at a later point-in-time).

As used herein, a "scope" may be a string and may convey information to a user/administrator for the corresponding stream (e.g., "FactoryMachines"). A scope may act as a namespace for stream identifiers (e.g., as folders do for files) and stream identifiers may be unique within a scope. Further, a stream may be uniquely identified by a combination of its stream identifier and scope. In one or more embodiments, a scope may be used to separate identifiers by tenants (in a multi-tenant environment), by a department of an organization, by a geographic location, and/or any other categorization a user selects.

One of ordinary skill will appreciate that the controller (162) may perform other functionalities without departing from the scope of the invention. The controller may be implemented using hardware, software, or any combination thereof.

In one or more embodiments, as being a stateless component, the SS (164) may (further) include functionality to, e.g.,: (i) manage the lifecycle of segments (where the SS may be unaware of streams but may store segment data); (ii) generate, merge, truncate, and/or delete segments, and serve read/write requests received from Client A (110A); (iii) use both a durable log (e.g., 166) and long-term storage (140) to store data and/or metadata; (iv) append new data to the durable log synchronously before responding to Client A, and write data asynchronously to the long-term storage (which is the primary destination of data); (v) use its cache to serve tail stream reads, to read ahead from the long-term storage, and/or to avoid reading from the durable log when writing to the long-term storage; (vi) monitor the rate of event traffic in each segment individually to identify trends and based on these trends, associate a trend label (described below) with the corresponding segment; (vii) make sure that each segment maps to only one SC (via a hash function) at any given time, in which that SS instance may maintain metadata (e.g., a rate of traffic into the related segment locally, a scaling type, a target rate, etc.); (viii) in response to a segment being identified as being either hot or cold, the hot/cold segment state is communicated to a central scaling coordinator component of the controller (162) (in which that component consolidates the individual hot/cold states of multiple segments and calculates a centralized auto-scaling decision for a stream such as by replacing hot segments with multiple new segments and/or replacing multiple cold segments with a consolidated new segment); (ix) be dependent on stateful components (e.g., the consensus service (168), the logger (166) (for the write ahead log functionalities)); (x) manage data paths (e.g., a write path, a read path, etc.); (xi) manage (and authenticate) data requests received from Client A; and/or (xii) manage a data plane of the streaming storage system (125) (e.g., implement read, write, and other data plane operations).

One of ordinary skill will appreciate that the SS (164) may perform other functionalities without departing from the scope of the invention. The SS may be implemented using hardware, software, or any combination thereof.

In one or more embodiments, a trend label may have one of three values, e.g., "normal", "hot", or "cold". A segment identified as "hot" may be characterized by a traffic trend that is greater than a predetermined target rate of traffic. The target rate may be supplied by a user via predetermined a stream policy (e.g., a stream/scaling policy may be defined on a data stream such that if a segment gets more than the required number of events, it may be divided). A segment identified as "cold" may be characterized by a traffic trend that is less than the target traffic rate. For example, a hot segment may be a candidate for scale-up into two or more new segments (e.g., Segment 2 being split into Segment 4 and Segment 5). As yet another example, a cold segment may be a candidate for scale-down via merger with one or more other cold segments (e.g., Segment 4 and Segment 5 being merged into Segment 6). As yet another example, a normal segment may be a candidate for remaining as a single segment.

In one or more embodiments, a consensus service may be required to have/keep a consistent view/state of a current SC distribution/assignment across the streaming storage systems (executing on the system (e.g., 100, FIG. 1.1)). For example, identifiers of SCs and their assignments may need to be consistent across the streaming storage systems and one way to achieve this is implementing the consensus service. To this end, the consensus service (168) (e.g., Apache Zookeeper) may include functionality to, e.g.,: (i) perform one or more coordination tasks (e.g., helping to the controller (162) for the assignment/distribution of SCs to SS instances, helping a split of workloads across segments, etc.), and/or (ii) store no stream metadata.

One of ordinary skill will appreciate that the consensus service (168) may perform other functionalities without departing from the scope of the invention. The consensus service may be implemented using hardware, software, or any combination thereof.

In one or more embodiments, SC A (165A) and SC B (165B) may allow users and/or applications to read/access data that was written in SC A and SC B and stored in the long-term storage (140) at the background. In one or more embodiments, SC A and SC B may be useful to perform an active-passive data replication. For example, SC A and SC B are writing data and at the same time, SS A and SS B may serve batch analytics tasks (e.g., batch reads) of data processing applications (of Client A (110A)) (for example, for a better user experience).

Further, the embodiment provided in FIG. 1.2 may utilize the inherent capabilities of the streaming storage system (125) to move data to the long-term storage (140) jointly with the SCs (e.g., 165A, 165B, etc.) as a form of active-passive data replication, which is useful for various different analytics workloads. For example, a user (of Client A (110A)) may perform real-time analytics on stream data (with the help of the logger (166), where the logger may persist the most recently written stream data) and at the same time, the related SCs (e.g., SC A, SC B, etc.) may move the data progressively to the long-term storage (140) (*i*) for serving batch reads/analytics at a later point-in-time (for example, upon receiving a batch read request from the user) and (ii) for enabling storage tiering capabilities provided by the streaming storage system (e.g., to perform active-passive data replication).

In one or more embodiments, as being part of the tiered storage streaming system (e.g., long-term storage), the long-term storage (140) may provide long-term (e.g., near-infinite retention), durable, high read/write throughput (e.g., to perform batch analytics; to perform generate, read, write, and delete operations; erasure coding; etc.) historical stream data storage/protection with near-infinite scale and low-cost. The long-term storage may be, for example (but not limited to): pluggable storage, AWS S3, Apache HDFS, Dell Isilon, Dell ECS, object storage, block storage, file system storage, etc. In one or more embodiments, the long-term storage may be located/deployed outside of the streaming storage system (125), in which asynchronous migration of events from a durable log to long-term storage (without affecting the performance of tail reads/writes) may reflect different access patterns to stream data.

In one or more embodiments, the long-term storage (140) may be a fully managed cloud (or local) storage that acts as a shared storage/memory resource that is functional to store unstructured and/or structured data. Further, the long-term storage may also occupy a portion of a physical storage/memory device or, alternatively, may span across multiple physical storage/memory devices.

In one or more embodiments, the long-term storage (140) may be implemented using physical devices that provide data storage services (e.g., storing data and providing copies of previously stored data). The devices that provide data storage services may include hardware devices and/or logical devices. For example, the long-term storage may include any quantity and/or combination of memory devices (i.e., volatile storage), long-term storage devices (i.e., persistent storage), other types of hardware devices that may provide short-term and/or long-term data storage services, and/or logical storage devices (e.g., virtual persistent storage/virtual volatile storage).

For example, the long-term storage (140) may include a memory device (e.g., a dual in-line memory device), in which data is stored and from which copies of previously stored data are provided. As yet another example, the long-term storage may include a persistent storage device (e.g., an SSD), in which data is stored and from which copies of previously stored data is provided. As yet another example, the long-term storage may include (i) a memory device in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data).

Further, the long-term storage (140) may also be implemented using logical storage. Logical storage (e.g., virtual disk) may be implemented using one or more physical storage devices whose storage resources (all, or a portion) are allocated for use using a software layer. Thus, logical storage may include both physical storage devices and an entity executing on a processor or another hardware device that allocates storage resources of the physical storage devices.

In one or more embodiments, the long-term storage (140) may store/log/record unstructured and/or structured data that may include (or specify), for example (but not limited to): a valid (e.g., a granted) request and its corresponding details, an invalid (e.g., a rejected) request and its corresponding details, historical stream data and its corresponding details, content of received/intercepted data packets/chunks, information regarding a sender (e.g., a malicious user, a high priority trusted user, a low priority trusted user, etc.) of data, information regarding the size of intercepted data packets, a mapping table that shows the mappings between an incoming request/call/network traffic and an outgoing request/call/network traffic, a cumulative history of user activity records obtained over a prolonged period of time, a cumulative history of network traffic logs obtained over a prolonged period of time, previously received malicious data access requests from an invalid user, a backup history documentation of a workload, a model name of a hardware component, a version of an application, a product identifier of an application, an index of an asset (e.g., a file, a folder, a segment, etc.), recently obtained customer/user information (e.g., records, credentials, etc.) of a user, a cumulative history of initiated model training operations (e.g., sessions) over a prolonged period of time, a restore history documentation of a workload, a documentation that indicates a set of jobs (e.g., a data backup job, a data restore job, etc.) that has been initiated, a documentation that indicates a status of a job (e.g., how many jobs are still active, how many jobs are completed, etc.), a cumulative history of initiated data backup operations over a prolonged period of time, a cumulative history of initiated data restore operations over a prolonged period of time, an identifier of a vendor, a profile of an invalid user, a fraud report for an invalid user, one or more outputs of the processes performed by the controller (162), power consumption of components of the streaming storage system (125), etc. Based on the aforementioned data, for example, the orchestrator (e.g., 127, FIG. 1.1) may perform user analytics to infer profiles of users communicating with components exist in the streaming storage system.

In one or more embodiments, the unstructured and/or structured data may be updated (automatically) by third-party systems (e.g., platforms, marketplaces, etc.) (provided by vendors) or by administrators based on, for example, newer (e.g., updated) versions of SLAs being available. The unstructured and/or structured data may also be updated when, for example (but not limited to): a data backup operation is initiated, a set of jobs is received, a data restore operation is initiated, an ongoing data backup operation is fully completed, etc.

In one or more embodiments, the unstructured and/or structured data may be maintained by, for example, IN A (e.g., 120A, FIG. 1.1). IN A may add, remove, and/or modify those data in the long-term storage (140) to cause the information included in the long-term storage to reflect the latest version of, for example, SLAs. The unstructured and/or structured data available in the long-term storage may be implemented using, for example, lists, tables, unstructured data, structured data, etc. While described as being stored locally, the unstructured and/or structured data may be stored remotely, and may be distributed across any number of devices without departing from the scope of the invention.

While the long-term storage (140) has been illustrated and described as including a limited number and type of data, the long-term storage may store additional, less, and/or different data without departing from the scope of the invention. In the embodiments described above, the long-term storage is demonstrated as a separate entity; however, embodiments herein are not limited as such. In one or more embodiments, the long-term storage may be a part of a cloud.

One of ordinary skill will appreciate that the long-term storage (140) may perform other functionalities without departing from the scope of the invention. The long-term storage may be implemented using hardware, software, or any combination thereof.

While FIG. 1.2 shows a configuration of components, other system configurations may be used without departing from the scope of the invention.

Turning now to FIG. 2, FIG. 2 shows an example reactive model-based auto-scaling of task managers (in data stream processing pipelines) in accordance with one or more embodiments of the invention. The embodiment shown in FIG. 2 may show a scenario where, by implementing a reactive model, the orchestrator (e.g., 127, FIG. 1.1) take decisions based on (i) metrics (e.g., data stream metrics from the streaming storage system (e.g., 125, FIG. 1.2) ingesting data) that are available at a given time and (ii) a user-defined auto-scaling policy (e.g., stream segments=task managers (which specifies one-to-one relationship between a number of parallel stream segments and a number of task managers)). One of ordinary skill will appreciate that the presented approach/framework in FIG. 2 may be applied to other scenarios without departing from the scope of the invention. For example, the presented framework may be applied to another user-defined auto-scaling policy that specifies one-to-four relationship between a number of parallel stream segments and a number of task managers.

As indicated in the scenario, the orchestrator (e.g., 127, FIG. 1.1) coordinates a source data stream and processing parallelism (by managing a number of task managers (illustrated by half dashed line rectangles) with respect to a number of parallel stream segments (illustrated by upward diagonal stripes included rectangles) associated with the source data stream). Referring to FIG. 2, (i) at "time 1" (t1), as being a candidate for a scale-up (because of an increased workload of the source data stream (e.g., consistently receiving a higher amount of writes)), a single "hot" stream segment being split into two "parallel" stream segments (by the controller (e.g., 162, FIG. 1.2)) while there is no change in the number of SSs (hosted by the streaming storage system (e.g., 125, FIG. 1.2)), (ii) at t2, as being a candidate for a further scale-up (because of an increased workload of the source data stream), the two "hot" stream segments being split into four stream segments (by the controller) while there is no change in the number of SSs (illustrated by solid line rectangles), (iii) at t3, as being a candidate for a scale-down (because of a reduced workload of the source data stream), the "cold" four stream segments being merged into three stream segments (by the controller) while there is no change in the number of SSs, (iv) at t4, as being a candidate for a scale-down (because of a reduced workload of the source data stream), the "cold" three stream segments being merged into two stream segments (by the controller) while there is no change in the number of SSs, and (v) at t5, as being a candidate for a scale-down (because of a reduced workload of the source data stream), the "cold" two stream segments being merged into a single stream segment (by the controller) while there is no change in the number of SSs.

As indicated above, Pravega streams are elastic, which means the streams may automatically change their degree of parallelism based on an ingestion workload, and users of Pravega may change scaling policies with respect to data streams based on events/bytes per second.

Based on (i) the above trend in the number of "parallel" stream segments, (ii) the user-defined scaling policy, and (iii) the data stream metrics, the orchestrator (e.g., 127, FIG. 1.1) automatically reacts and increases (e.g., auto-scales) the number of task managers executing on the stream processing system (e.g., 102, FIG. 1.1). Specifically, (i) at t1, the orchestrator scales up the number of task managers (e.g., 1→2), in parallel to the change in the number of stream segments; (ii) at t2, the orchestrator scales up the number of task managers (e.g., 2→4), in parallel to the change in the number of stream segments; (iii) at t3, the orchestrator scales down the number of task managers (e.g., 4→3), in parallel to the change in the number of stream segments; (iv) at t4, the orchestrator scales down the number of task managers (e.g., 3→2), in parallel to the change in the number of stream segments; and (v) at t5, the orchestrator scales down the number of task managers (e.g., 2→1), in parallel to the change in the number of stream segments. Further, the modifications in the number of task managers indicates that the stream processing job (received by the stream processing system) is not, for example, CPU intensive so that a single task manager may process events/data from multiple stream segments in parallel (e.g., to provide computer-implemented services to a user).

Figure 3:
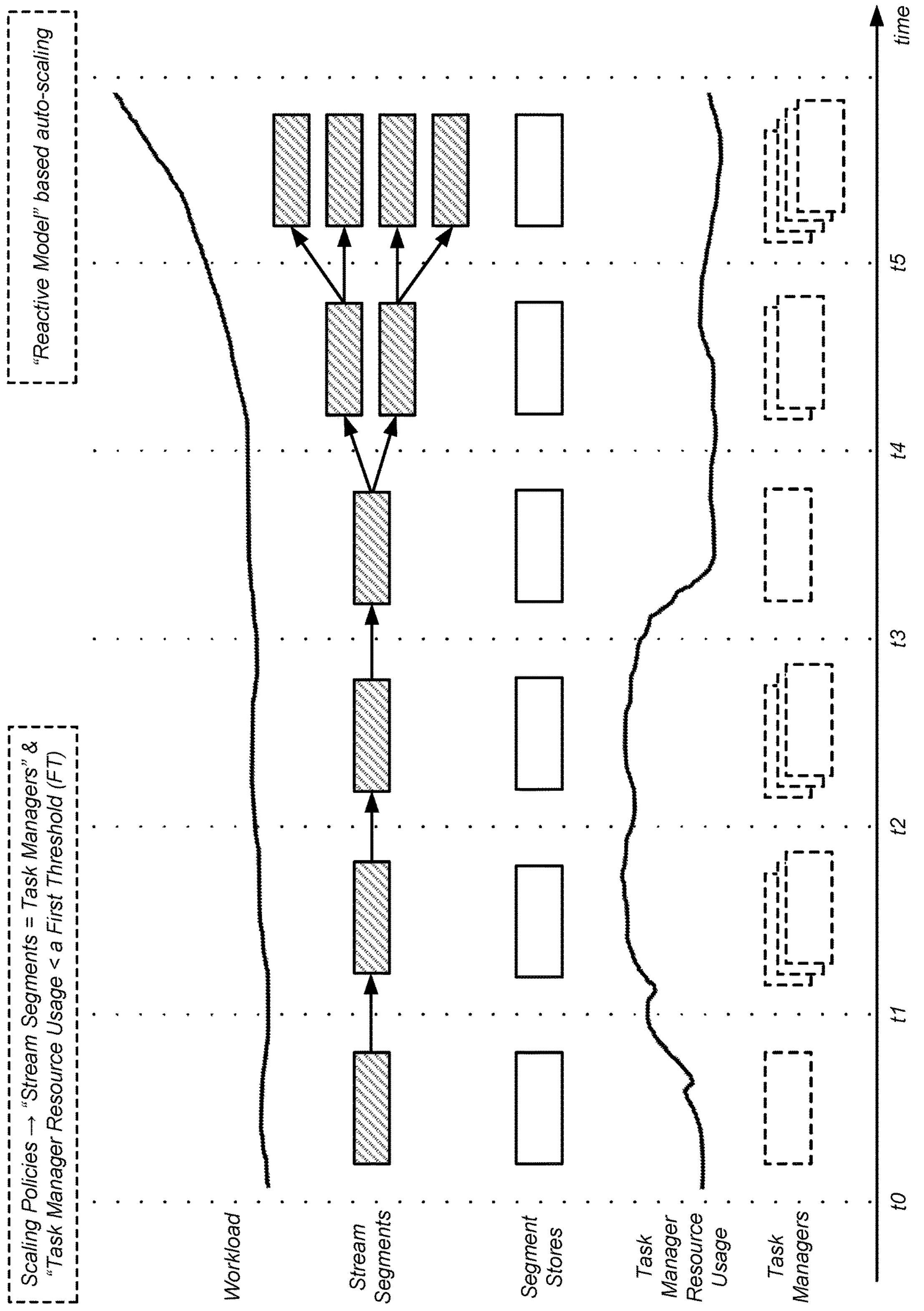
FIG. 3 shows an example reactive model-based auto-scaling of task managers in accordance with one or more embodiments of the invention.

Turning now to FIG. 3, FIG. 3 shows an example reactive model-based auto-scaling of task managers (in data stream processing pipelines) in accordance with one or more embodiments of the invention. The embodiment shown in FIG. 3 may show a scenario where, by implementing a reactive model, the orchestrator (e.g., 127, FIG. 1.1) take decisions based on (i) metrics (e.g., data stream metrics from the streaming storage system (e.g., 125, FIG. 1.2) and resource related metrics from the stream processing system (e.g., 102, FIG. 1.1)) that are available at a given time and (ii) user-defined auto-scaling policies (e.g., (a) stream segments=task managers (which specifies one-to-one relationship between a number of parallel stream segments and a number of task managers) and (b) task manager resource usage<a first threshold (50%) (which specifies generation of an additional task manager(s) in the stream processing system when a RUV of a resource exceeds the first threshold (e.g., the predetermined maximum RUV threshold value)). One of ordinary skill will appreciate that the presented approach/framework in FIG. 3 may be applied to other scenarios without departing from the scope of the invention. For example, the presented framework may be applied to another user-defined auto-scaling policy that specifies one-to-two relationship between a number of parallel stream segments and a number of task managers.

As indicated in the scenario, the orchestrator (e.g., 127, FIG. 1.1) coordinates the end-to-end data stream processing pipeline (encompassing storage and compute) by managing a number of task managers (illustrated by half dashed line rectangles) with respect to (a) a number of parallel stream segments (illustrated by upward diagonal stripes included rectangles) associated with a source data stream and (b) a task manager's resource usage (or RUV). Referring to FIG. 3, between t1-t3, the workload of the source data stream (for one job) shows a low trend (e.g., consistently receiving a normal amount of writes). However, as task managers may execute additional tasks from other concurrent jobs in a given data stream processing pipeline, the task managers may show, for example, a high CPU utilization. To this end, at t1, the orchestrator reacts and scales up the number of task managers (e.g., 1→3) (while there is no change in the number of SSs (illustrated by solid line rectangles)) in order to manage the high CPU utilization.

Thereafter, at t3, the CPU utilization decreases and the orchestrator (e.g., 127, FIG. 1.1) scales down the number of task managers (e.g., 3→1) (while there is no change in the number of SSs) accordingly (e.g., to accommodate the low CPU utilization). At a later point-in-time (at t4), as being a candidate for a scale-up (because of an increased workload of the source data stream), a single "hot" stream segment being split into two "parallel" stream segments (by the controller (e.g., 162, FIG. 1.2)) while there is no change in the number of SSs. Further, at t5, as being a candidate for a further scale-up (because of an increased workload of the source data stream), the two "hot" stream segments being split into four stream segments (by the controller) while there is no change in the number of SSs.

Based on (i) the above trend in the number of "parallel" stream segments, (ii) the corresponding user-defined scaling policy, and (iii) the data stream metrics, the orchestrator (e.g., 127, FIG. 1.1) automatically reacts and increases (e.g., auto-scales) the number of task managers executing on the stream processing system (e.g., 102, FIG. 1.1). Specifically, (i) at t4, the orchestrator scales up the number of task managers (e.g., 1→2), in parallel to the change in the number of stream segments and (ii) at t5, the orchestrator scales up the number of task managers (e.g., 2→4), in parallel to the change in the number of stream segments.

Figure 4:
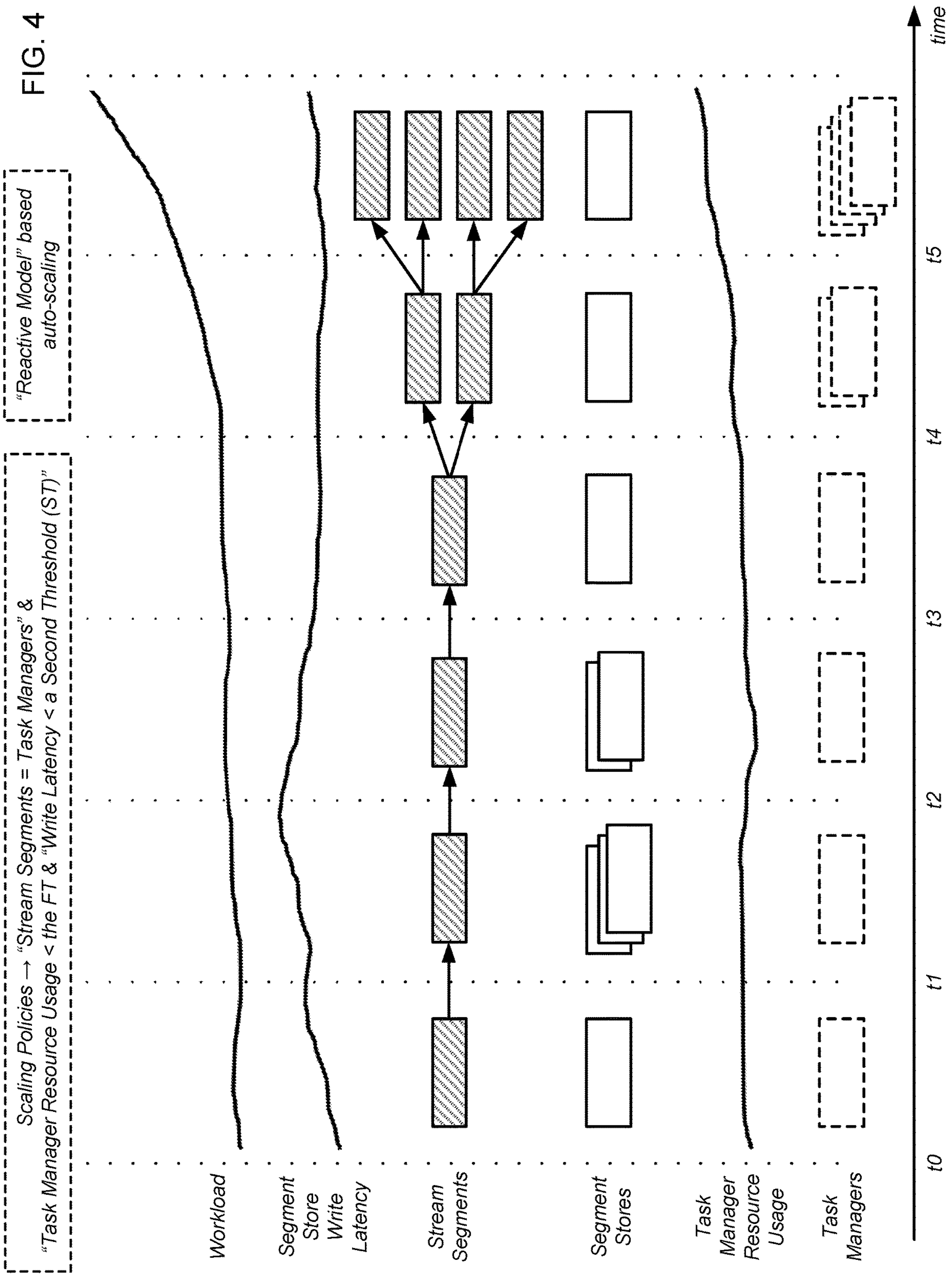
FIG. 4 shows an example reactive model-based auto-scaling of task managers and segment stores in accordance with one or more embodiments of the invention.

Turning now to FIG. 4, FIG. 4 shows an example reactive model-based auto-scaling of task managers and segment stores (in data stream processing pipelines) in accordance with one or more embodiments of the invention. The embodiment shown in FIG. 4 may show a scenario where, by implementing a reactive model, the orchestrator (e.g., 127, FIG. 1.1) take decisions based on (i) metrics (e.g., data stream metrics from the streaming storage system (e.g., 125, FIG. 1.2) and resource related metrics from the stream processing system (e.g., 102, FIG. 1.1)) that are available at a given time and (ii) user-defined auto-scaling policies (e.g., (a) stream segments=task managers (which specifies one-to-one relationship between a number of parallel stream segments and a number of task managers), (b) task manager resource usage<a first threshold (50%) (which specifies generation of an additional task manager(s) in the stream processing system when a RUV of a resource exceeds the first threshold (e.g., the predetermined maximum RUV threshold value)), and (c) segment store write latency<a second threshold (P95<100 ms) (which specifies generation of an additional task manager(s) in the stream processing system when the $95^{th}$ percentile of an end-to-end write latency exceeds 100 ms)). One of ordinary skill will appreciate that the presented approach/framework in FIG. 4 may be applied to other scenarios without departing from the scope of the invention. For example, the presented framework may be applied to another user-defined auto-scaling policy that specifies one-to-four relationship between a number of parallel stream segments and a number of task managers.

As indicated in the scenario, the orchestrator (e.g., 127, FIG. 1.1) coordinates the end-to-end data stream processing pipeline (encompassing storage and compute) by managing (i) a number of task managers (illustrated by half dashed line rectangles) with respect to (a) a number of parallel stream segments (illustrated by upward diagonal stripes included rectangles) associated with a source data stream and (b) a task manager's resource usage (or RUV) and (ii) a number of segment stores (illustrated by solid line rectangles) with respect to segment store write latency.

Referring to FIG. 4, between t1-t4, the workload of the source data stream (for one job) shows a low trend (e.g., consistently receiving a normal amount of writes). However, as task managers may execute additional tasks from other concurrent jobs in a given data stream processing pipeline, the task managers may show, for example, a high CPU utilization. On the other hand, at t4, as being a candidate for a scale-up (because of an increased workload of the source data stream), a single "hot" stream segment being split into two "parallel" stream segments (by the controller (e.g., 162, FIG. 1.2)) while there is no change in the number of SSs. Further, at t5, as being a candidate for a further scale-up (because of an increased workload of the source data stream), the two "hot" stream segments being split into four stream segments (by the controller) while there is no change in the number of SSs.

Based on (i) the above trend in the number of "parallel" stream segments, (ii) the corresponding user-defined scaling policy, (iii) the data stream metrics, (iv) in order to manage the high CPU utilization, the orchestrator (e.g., 127, FIG. 1.1) automatically reacts and increases (e.g., auto-scales) the number of task managers executing on the stream processing system (e.g., 102, FIG. 1.1). Specifically, (i) at t4, the orchestrator scales up the number of task managers (e.g., 1→2), in parallel to the change in the number of stream segments and (ii) at t5, the orchestrator scales up the number of task managers (e.g., 2→4), in parallel to the change in the number of stream segments.

Further, between t0-t2, the streaming storage system (e.g., 125, FIG. 1.2) receives a high amount of workload from other data streams, which may be unrelated to the performance of the stream processing system (e.g., 102, FIG. 1.1). However, this may affect the overall data stream processing pipeline (e.g., the processing performance of a streaming job), as task managers reads/writes data from SSs for processing. To this end, at t1, the orchestrator reacts and scales up the number of SSs (e.g., 1→3) in order to (a) maintain low end-to-end latency across the overall data stream processing pipeline and (b) distribute the workload across a larger set of SSs. Thereafter, once the end-to-end latency goes back to acceptable levels, the orchestrator reacts and scales down the number of SSs (i) at t2, from three to two and (ii) at t3, from two to one.

Figure 5:
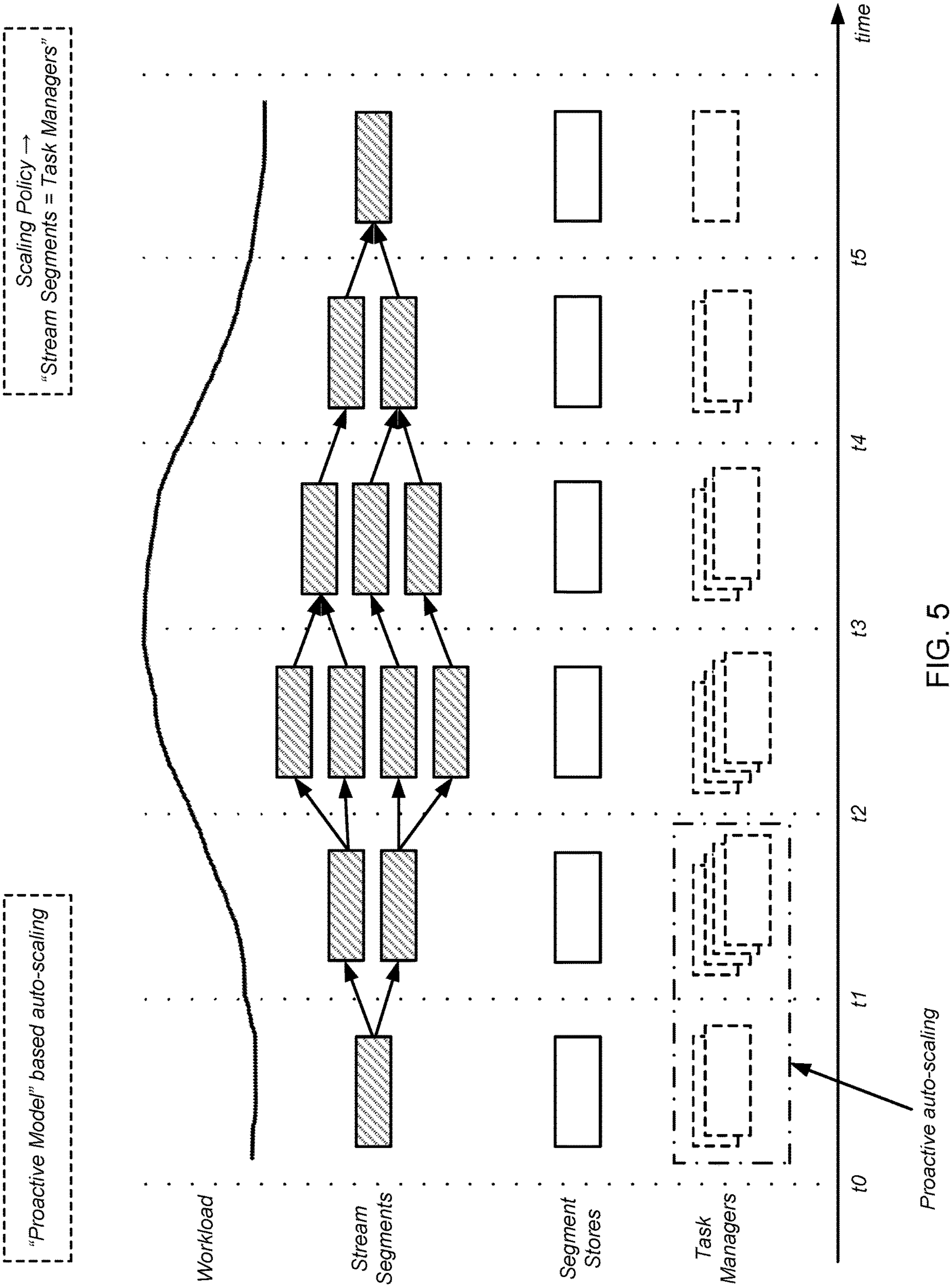
FIG. 5 shows an example proactive model-based auto-scaling of task managers in accordance with one or more embodiments of the invention.

Turning now to FIG. 5, FIG. 5 shows an example proactive model-based auto-scaling of task managers (in data stream processing pipelines) in accordance with one or more embodiments of the invention. The embodiment shown in FIG. 5 may show a scenario where, (i) by implementing a proactive model, (ii) analyzing previous streaming workloads and metrics, and (iii) based on a user-defined auto-scaling policy (e.g., stream segments=task managers (which specifies one-to-one relationship between a number of parallel stream segments and a number of task managers)), the orchestrator (e.g., 127, FIG. 1.1) forecasts/classifies/predicts possible bottlenecks/fluctuations (in the near future) across an end-to-end data stream processing pipeline (e.g., including the SSs and/or task managers). By doing this, the orchestrator may auto-scale, for example, the number of task managers before a workload spike occurs in the pipeline, and therefore, be able to handle the workload spike without the spike affects the whole pipeline.

One of ordinary skill will appreciate that the presented approach/framework in FIG. 5 may be applied to other scenarios without departing from the scope of the invention.

For example, the presented framework may be applied to another user-defined auto-scaling policy that specifies one-to-two relationship between a number of parallel stream segments and a number of task managers.

In one or more embodiments, the orchestrator (e.g., 127, FIG. 1.1) may have a functionality to execute a proactive model (e.g., any type of ML model such as a decision tree model) using a set of input parameters, such as, previous historical metrics, analysis results regarding previous workloads and metrics, and/or previous orchestrator decisions (e.g., a decision to increase the number of SSs and/or task managers), in which the proactive model may proactively trigger the scaling of the number of both SSs and/or task managers.

In one or more embodiments, to be able to proactively trigger the scaling of a corresponding component, the orchestrator (e.g., 127, FIG. 1.1) may implement two phases (e.g., phase-1 and phase-2). In phase-1, the orchestrator trains the proactive model using/analyzing the set of input parameters (so that the trained proactive model being trained may take appropriate auto-scale decisions (ahead of time) on future conditions).

In phase-2 and compared to the scenario presented in FIG. 2, in FIG. 5 and between t0 and t1, the trained proactive model performs proactive auto-scaling and scales up the number of task managers before a single "hot" stream segment being split into two "parallel" stream segments (by the controller (e.g., 162, FIG. 1.2)). The trained proactive model scales up the number of task managers (while there is no change in the number of SSs because, based on phase-1, the model predicts that a workload of a source data stream will be increased in the near future. Similarly, between t1 and t2, the trained proactive model performs proactive auto-scaling and scales up the number of task managers before the two "hot" stream segments being split into four stream segments (by the controller). The trained proactive model scales up the number of task managers (while there is no change in the number of SSs) because, based on phase-1, the model predicts that a workload of a source data stream will be increased in the near future.

Thereafter, (i) at t3, as being a candidate for a scale-down (because of a reduced workload of the source data stream), the "cold" four stream segments being merged into three stream segments (by the controller) while there is no change in the number of SSs, (ii) at t4, as being a candidate for a scale-down (because of a reduced workload of the source data stream), the "cold" three stream segments being merged into two stream segments (by the controller) while there is no change in the number of SSs, and (iii) at t5, as being a candidate for a scale-down (because of a reduced workload of the source data stream), the "cold" two stream segments being merged into a single stream segment (by the controller) while there is no change in the number of SSs.

Based on (i) the above trend in the number of "parallel" stream segments, (ii) the user-defined scaling policy, and (iii) the data stream metrics, the trained proactive model automatically reacts and increases (e.g., auto-scales) the number of task managers executing on the stream processing system (e.g., 102, FIG. 1.1). Specifically, (i) at t3, the trained model scales down the number of task managers (e.g., 4→3), in parallel to the change in the number of stream segments; (ii) at t4, the trained model scales down the number of task managers (e.g., 3→2), in parallel to the change in the number of stream segments; and (iii) at t5, the trained model scales down the number of task managers (e.g., 2→1), in parallel to the change in the number of stream segments.

In one or more embodiments, if the trained proactive model is not operating properly (e.g., is not providing the above-discussed functionalities), the trained model may be re-trained using any form of training data and/or the trained model may be updated periodically as there are improvements in the trained models.

Figure 6:
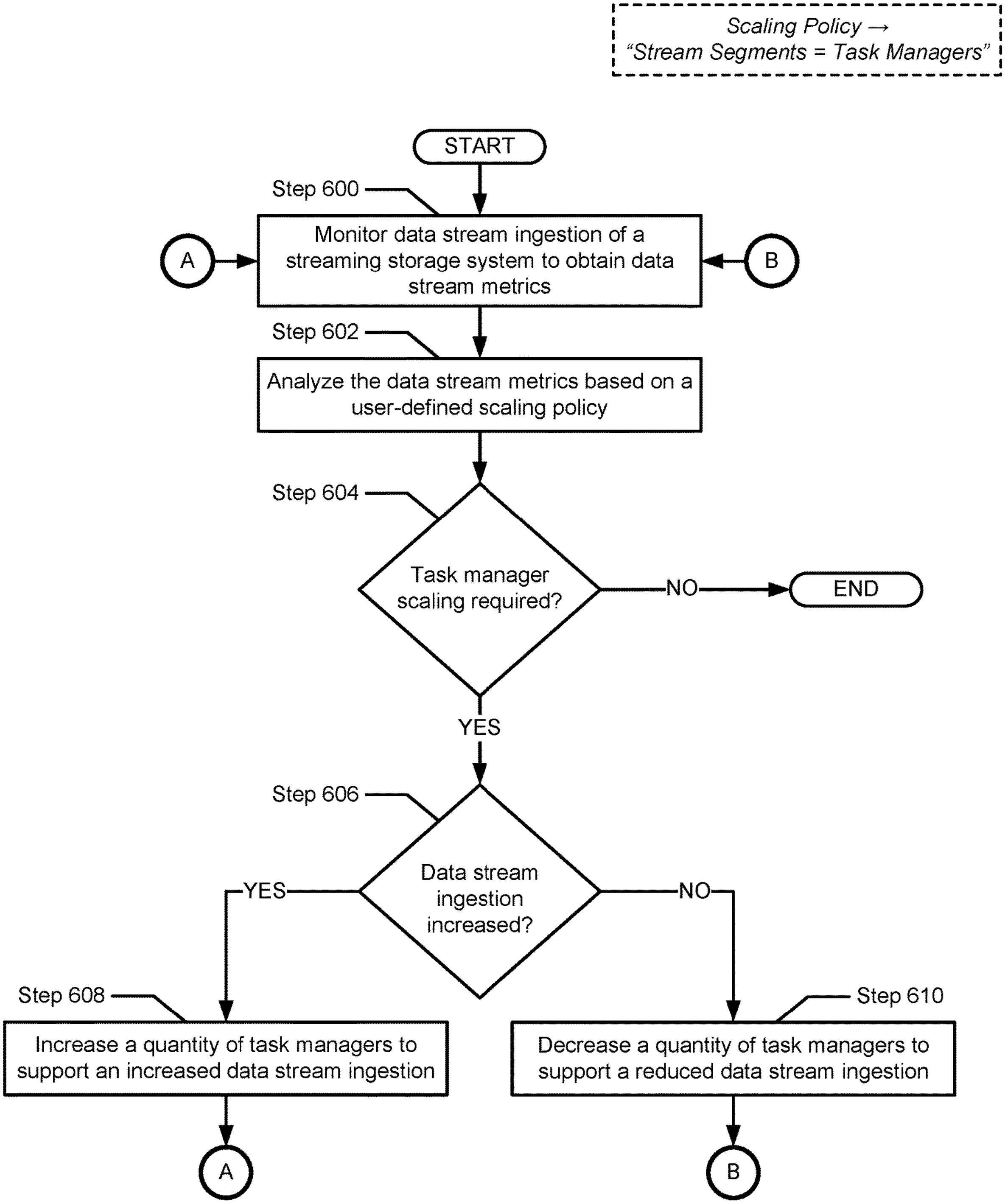
FIG. 6 shows a method for managing a data stream processing pipeline in accordance with one or more embodiments of the invention.

FIG. 6 shows a method for managing a data stream processing pipeline in accordance with one or more embodiments of the invention. While various steps in the method are presented and described sequentially, those skilled in the art will appreciate that some or all of the steps may be executed in different orders, may be combined or omitted, and some or all steps may be executed in parallel without departing from the scope of the invention.

Turning now to FIG. 6, the method shown in FIG. 6 may be executed by, for example, the above-discussed orchestrator (e.g., 127, FIG. 1.1). Other components of the system (100) illustrated in FIG. 1.1 may also execute all or part of the method shown in FIG. 6 without departing from the scope of the invention.

In Step 600, the orchestrator monitors data stream ingestion of the streaming storage system (e.g., 125, FIG. 1.1) to obtain/gather data stream metrics (e.g., associated with one or more SSs, where ingestion data stream represents a bound for an end-to-end data stream processing pipeline, not only in terms of ingestion throughput, but also in terms of read/write parallelism for data processing). In one or more embodiments, the data stream metrics (which is one of the foundations of taking auto-scale decisions) are obtained via any technique for receiving data, such as, for example, over a network (e.g., 130, FIG. 1.1), manually, etc. The data stream metrics may be obtained/received (e.g., from the controller (e.g., 162, FIG. 1.2)) at one time (e.g., on demand), or may be obtained at any number of different times (e.g., periodically) and aggregated to form the data stream metrics. Details of the data stream metrics are described above in reference to FIG. 1.1.

In one or more embodiments, before analyzing (in Step 602) the data stream metrics, the orchestrator may store (temporarily or permanently) the data stream metrics in the database.

In Step 602, by employing a set of linear, non-linear, and/or ML models (e.g., a reactive model), the orchestrator reactively analyzes the data stream metrics (obtained in Step 600) based on a user-defined scaling policy (e.g., stream segments=task managers (which specifies one-to-one relationship)). In one or more embodiments, based on the analysis, the orchestrator may, for example (but not limited to): infer information regarding an elastic data stream (e.g., because of the fluctuations in the ingestion workload, a data stream may change the number of parallel segments dynamically), obtain information regarding how task managers have been utilized in the end-to-end data stream processing pipeline in order to increase performance and reliability of the stream processing system, obtain information regarding how SSs have been utilized in the end-to-end data stream processing pipeline, etc.

In Step 604, based on Step 602, the orchestrator makes a first determination (in real-time or near real-time) as to whether a task manager scaling is required. Accordingly, in one or more embodiments, if the result of the first determination is YES, the method proceeds to Step 606. If the result of the first determination is NO, the method alternatively ends.

In Step 606, as a result of the first determination in Step 604 being YES, the orchestrator makes a second determination (in real-time or near real-time) as to whether data stream ingestion is increased. Accordingly, in one or more embodiments, if the result of the second determination is YES, the method proceeds to Step 608. If the result of the second determination is NO, the method alternatively proceeds to Step 610.

For example, assume here that at t1, as being a candidate for a scale-up (because of an increased workload of a source data stream (e.g., consistently receiving a higher amount of writes)), a single "hot" stream segment being split into two "parallel" stream segments (by the controller (e.g., 162, FIG. 1.2)) while there is no change in the number of SSs. Based on (i) the above trend in the number of "parallel" stream segments, (ii) the user-defined scaling policy, and (iii) the data stream metrics, the orchestrator concludes the result of the first determination as YES.

As yet another example, assume here that at t3, as being a candidate for a scale-down (because of a reduced workload of the source data stream, "cold" four stream segment being merged into two stream segments (by the controller) while there is no change in the number of SSs. Based on (i) the above trend in the number of "parallel" stream segments, (ii) the user-defined scaling policy, and (iii) the data stream metrics, the orchestrator concludes the result of the first determination as NO.

In Step 608, as a result of the second determination in Step 606 being YES, based on the user-defined scaling policy, and for a better end-to-end data stream processing pipeline management, the orchestrator automatically reacts and increases (e.g., auto-scales) a quantity of task managers (with the help of their dynamic runtime adaptation feature) executing on the stream processing system to support the increased data stream ingestion and to have more compute power. Specifically, referring to the first example described in Step 606, at t1, the orchestrator scales up the quantity of task managers (e.g., 1→2), in parallel to the change in the number of stream segments. Thereafter, the method returns to Step 600 in order to continuously monitor the end-to-end data stream processing pipeline, analyze the metrics, and react accordingly.

In Step 610, as a result of the second determination in Step 606 being NO, based on the user-defined scaling policy, and for a better end-to-end data stream processing pipeline management, the orchestrator automatically reacts and decreases (e.g., auto-scales) a quantity of task managers (with the help of their dynamic runtime adaptation feature) executing on the stream processing system to support/accommodate a reduced data stream ingestion. Specifically, referring to the second example described in Step 606, at t3, the orchestrator scales down the quantity of task managers (e.g., 4→2), in parallel to the change in the number of stream segments. Thereafter, the method returns to Step 600 in order to continuously monitor the end-to-end data stream processing pipeline, analyze the metrics, and react accordingly.

FIGS. 7.1 and 7.2 show a method for managing a data stream processing pipeline in accordance with one or more embodiments of the invention. While various steps in the method are presented and described sequentially, those skilled in the art will appreciate that some or all of the steps may be executed in different orders, may be combined or omitted, and some or all steps may be executed in parallel without departing from the scope of the invention.

Turning now to FIG. 7.1, the method shown in FIG. 7.1 may be executed by, for example, the above-discussed orchestrator. Other components of the system (100) illustrated in FIG. 1.1 may also execute all or part of the method shown in FIG. 7.1 without departing from the scope of the invention.

In Step 700, the orchestrator monitors data stream ingestion of the streaming storage system to obtain data stream metrics. In one or more embodiments, the data stream metrics are obtained via any technique for receiving data, such as, for example, over the network, manually, etc. The data stream metrics may be obtained at one time, or may be obtained at any number of different times and aggregated to form the data stream metrics.

In one or more embodiments, before analyzing (in Step 704) the data stream metrics, the orchestrator may store (temporarily or permanently) the data stream metrics in the database.

In Step 702, the orchestrator monitors, at least, an RUV of a resource (or an RUV of each resource) associated with the stream processing system to obtain resource related metrics. In one or more embodiments, the resource related metrics are obtained (e.g., from task managers, job managers (e.g., 106A, etc., FIG. 1.1), etc.) via any technique for receiving data, such as, for example, over the network, manually, etc. The resource related metrics may be obtained at one time, or may be obtained at any number of different times and aggregated to form the resource related metrics. Details of the resource related metrics are described above in reference to FIG. 1.1.

In one or more embodiments, before analyzing (in Step 706) the resource related metrics, the orchestrator may store (temporarily or permanently) the resource related metrics in the database.

In Step 704, by employing a set of linear, non-linear, and/or ML models (e.g., the reactive model), the orchestrator reactively analyzes the data stream metrics (obtained in Step 700) based on a first user-defined scaling policy (e.g., stream segments=task managers (which specifies one-to-one relationship)). In one or more embodiments, based on the analysis, the orchestrator may, for example (but not limited to): infer information regarding an elastic data stream, obtain information regarding how task managers have been utilized in the end-to-end data stream processing pipeline in order to increase performance and reliability of the stream processing system, etc.

In Step 706, by employing a set of linear, non-linear, and/or ML models (e.g., the reactive model), the orchestrator reactively analyzes the resource related metrics (obtained in Step 702) based on a second user-defined scaling policy (e.g., task manager resource usage<a first threshold (which specifies generation of an additional task manager(s) in the stream processing system when a RUV of a resource exceeds the first threshold). In one or more embodiments, based on the analysis, the orchestrator may, for example (but not limited to): infer information regarding the RUV of the resource, obtain information regarding how task managers have been utilized in the end-to-end data stream processing pipeline in order to increase performance and reliability of the stream processing system, etc.

In Step 708, based on Steps 704 and 706, the orchestrator makes a first determination (in real-time or near real-time) as to whether a task manager scaling is required. Accordingly, in one or more embodiments, if the result of the first determination is YES, the method proceeds to Step 710. If the result of the first determination is NO, the method alternatively ends.

In Step 710, as a result of the first determination in Step 708 being YES, the orchestrator makes a second determination (in real-time or near real-time) as to whether data stream ingestion is increased. Accordingly, in one or more embodiments, if the result of the second determination is YES, the method proceeds to Step 714 (of FIG. 7.2). If the result of the determination is NO (which means there is no change in a number of parallel stream segments), the method alternatively proceeds to Step 712.

In Step 712, as a result of the second determination in Step 710 being NO and based on the second user-defined scaling policy, the orchestrator makes a third determination (in real-time or near real-time) as to whether the RUV of the resource exceeds the first threshold (or the predetermined maximum RUV threshold value). Accordingly, in one or more embodiments, if the result of the third determination is YES (which may indicate health of a corresponding task manager is not in a compromised state (e.g., healthy)), the method proceeds to Step 716 of FIG. 7.2. If the result of the determination is NO (which may indicate health of a corresponding task manager is in a compromised state (e.g., not healthy)), the method alternatively proceeds to Step 718 of FIG. 7.2. In one or more embodiments, Step 712 may be repeated for all the identified resources in Step 702.

Turning now to FIG. 7.2, the method shown in FIG. 7.2 may be executed by, for example, the above-discussed orchestrator. Other components of the system (100) illustrated in FIG. 1.1 may also execute all or part of the method shown in FIG. 7.2 without departing from the scope of the invention.

In Step 714, as a result of the second determination in Step 710 (of FIG. 7.1) being YES, based on the first user-defined scaling policy, and for a better end-to-end data stream processing pipeline management, the orchestrator automatically reacts and increases a quantity of task managers executing on the stream processing system to support the increased data stream ingestion and to have more compute power. For example, at t2, the orchestrator scales up the quantity of task managers (e.g., 2→3), in parallel to the change in the number of stream segments. Thereafter, the method returns to Step 700 in order to continuously monitor the end-to-end data stream processing pipeline, analyze the metrics, and react accordingly.

In Step 716, as a result of the third determination in Step 712 being YES, based on the second user-defined scaling policy, and for a better end-to-end data stream processing pipeline management, the orchestrator automatically reacts and decreases a quantity of task managers executing on the stream processing system to support/accommodate a reduced data stream ingestion or to support a reduced RUV of the resource. For example, at t4, the orchestrator scales down the quantity of task managers (e.g., 3→2), in parallel to the change in the number of stream segments. Thereafter, the method returns to Step 700 in order to continuously monitor the end-to-end data stream processing pipeline, analyze the metrics, and react accordingly.

In Step 718, as a result of the third determination in Step 712 being NO, based on the second user-defined scaling policy, and for a better end-to-end data stream processing pipeline management, the orchestrator automatically reacts and increases a quantity of task managers executing on the stream processing system to reduce the RUV of the resource (e.g., to perform load balancing across the stream processing system). For example, when CPU utilization of a specific task manager reaches a certain level, the orchestrator may keep adding (in conjunction with a corresponding job manager) new task managers until the CPU utilization falls behind the first threshold. Thereafter, the method returns to Step 700 in order to continuously monitor the end-to-end data stream processing pipeline, analyze the metrics, and react accordingly.

FIGS. 8.1-8.3 show a method for managing a data stream processing pipeline in accordance with one or more embodiments of the invention. While various steps in the method are presented and described sequentially, those skilled in the art will appreciate that some or all of the steps may be executed in different orders, may be combined or omitted, and some or all steps may be executed in parallel without departing from the scope of the invention.

Turning now to FIG. 8.1, the method shown in FIG. 8.1 may be executed by, for example, the above-discussed orchestrator. Other components of the system (100) illustrated in FIG. 1.1 may also execute all or part of the method shown in FIG. 8.1 without departing from the scope of the invention.

In Step 800, the orchestrator monitors data stream ingestion of the streaming storage system to obtain data stream metrics. In one or more embodiments, the data stream metrics are obtained via any technique for receiving data, such as, for example, over the network, manually, etc. The data stream metrics may be obtained at one time, or may be obtained at any number of different times and aggregated to form the data stream metrics.

In one or more embodiments, before analyzing (in Step 804) the data stream metrics, the orchestrator may store (temporarily or permanently) the data stream metrics in the database.

In Step 802, the orchestrator monitors, at least, an RUV of a resource (or an RUV of each resource) associated with the stream processing system to obtain resource related metrics. In one or more embodiments, the resource related metrics are obtained via any technique for receiving data, such as, for example, over the network, manually, etc. The resource related metrics may be obtained at one time, or may be obtained at any number of different times and aggregated to form the resource related metrics.

In one or more embodiments, before analyzing (in Step 806) the resource related metrics, the orchestrator may store (temporarily or permanently) the resource related metrics in the database.

In Step 804, by employing a set of linear, non-linear, and/or ML models (e.g., the reactive model), the orchestrator reactively analyzes the data stream metrics (obtained in Step 800) based on a first user-defined scaling policy (e.g., stream segments=task managers (which specifies one-to-one relationship)) and a second user-defined scaling policy (e.g., task manager resource usage<a first threshold (which specifies generation of an additional task manager(s) in the stream processing system when a RUV of a resource exceeds the first threshold). In one or more embodiments, based on the analysis, the orchestrator may, for example (but not limited to): infer information regarding an elastic data stream, obtain information regarding how task managers have been utilized in the end-to-end data stream processing pipeline in order to increase performance and reliability of the stream processing system, infer information regarding the RUV of the resource, etc.

In Step 806, by employing a set of linear, non-linear, and/or ML models (e.g., the reactive model), the orchestrator reactively analyzes the resource related metrics (obtained in Step 802) based on a third user-defined scaling policy (e.g., segment store write latency<a second threshold (P95<100 ms) (which specifies generation of an additional task manager(s) in the stream processing system when the $95^{th}$ percentile of an end-to-end write latency exceeds 100 ms)).

In one or more embodiments, based on the analysis, the orchestrator may infer, for example (but not limited to): information regarding network latency, information about an end-to-end write latency, a number of open ports, network port open/close integrity, readiness of each job/task manager, a number of dropped data packets, maximum network latency threshold (e.g., a predetermined write latency threshold value) that needs to be met by a worker node, a network BW of a network, an expected latency for a network configuration in a network, a maximum dropped packets threshold that needs to be met by a task manager, a maximum storage I/O latency threshold that needs to be met by a task manager, etc.

In Step 808, based on Steps 804 and 806, the orchestrator makes a first determination (in real-time or near real-time) as to whether a task manager scaling is required. Accordingly, in one or more embodiments, if the result of the first determination is YES, the method proceeds to Step 818 (of FIG. 8.3). If the result of the first determination is NO, the method alternatively proceeds to Step 810 (of FIG. 8.2).

Turning now to FIG. 8.2, the method shown in FIG. 8.2 may be executed by, for example, the above-discussed orchestrator. Other components of the system (100) illustrated in FIG. 1.1 may also execute all or part of the method shown in FIG. 8.2 without departing from the scope of the invention.

In Step 810, as a result of the first determination in Step 808 (of FIG. 8.1) being NO, the orchestrator makes a second determination (in real-time or near real-time) as to whether SS scaling is required. Accordingly, in one or more embodiments, if the result of the second determination is YES, the method proceeds to Step 812. If the result of the determination is NO, the method alternatively ends.

In Step 812, as a result of the second determination in Step 810 being YES and based on the third user-defined scaling policy, the orchestrator makes a third determination (in real-time or near real-time) as to whether the end-to-end write latency across the data stream processing pipeline exceeds the second threshold (or a predetermined write latency threshold value). Accordingly, in one or more embodiments, if the result of the third determination is YES, the method proceeds to Step 814. If the result of the determination is NO, the method alternatively proceeds to Step 816.

In Step 814, as a result of the third determination in Step 812 being YES, based on the third user-defined scaling policy, to reduce possible network latency (for example, for mission critical and/or latency-sensitive applications), and for a better end-to-end data stream processing pipeline management, the orchestrator automatically reacts and increases a quantity of SSs (i) to establish a low end-to-end write latency across the data stream processing pipeline and (ii) to distribute data stream ingestion across a larger quantity of SSs. Thereafter, the method returns to Step 800 (of FIG. 8.1) in order to continuously monitor the end-to-end data stream processing pipeline, analyze the metrics, and react accordingly.

In Step 816, as a result of the third determination in Step 812 being NO, based on the third user-defined scaling policy, and for a better end-to-end data stream processing pipeline management, the orchestrator automatically reacts and decreases a quantity of SSs to support/accommodate a low end-to-end write latency across the data stream processing pipeline. Thereafter, the method returns to Step 800 (of FIG. 8.1) in order to continuously monitor the end-to-end data stream processing pipeline, analyze the metrics, and react accordingly.

Turning now to FIG. 8.3, the method shown in FIG. 8.3 may be executed by, for example, the above-discussed orchestrator. Other components of the system (100) illustrated in FIG. 1.1 may also execute all or part of the method shown in FIG. 8.3 without departing from the scope of the invention.

In Step 818, as a result of the first determination in Step 808 (of FIG. 8.1) being YES, the orchestrator makes a fourth determination (in real-time or near real-time) as to whether data stream ingestion is increased. Accordingly, in one or more embodiments, if the result of the fourth determination is YES, the method proceeds to Step 820. If the result of the fourth determination is NO, the method alternatively proceeds to Step 822.

In Step 820, as a result of the fourth determination in Step 818 being YES, based on the first user-defined scaling policy, and for a better end-to-end data stream processing pipeline management, the orchestrator automatically reacts and increases a quantity of task managers executing on the stream processing system to support the increased data stream ingestion and to have more compute power. For example, at t5, the orchestrator scales up the quantity of task managers (e.g., 4→6), in parallel to the change in the number of stream segments. Thereafter, the method returns to Step 800 (of FIG. 8.1) in order to continuously monitor the end-to-end data stream processing pipeline, analyze the metrics, and react accordingly.

In Step 822, as a result of the fourth determination in Step 818 being NO and based on the second user-defined scaling policy, the orchestrator makes a fifth determination (in real-time or near real-time) as to whether the RUV of the resource exceeds the first threshold (or the predetermined maximum RUV threshold value). Accordingly, in one or more embodiments, if the result of the fifth determination is YES, the method proceeds to Step 826. If the result of the fifth determination is NO, the method alternatively proceeds to Step 824. In one or more embodiments, Step 822 may be repeated for all the identified resources in Step 802.

In Step 824, as a result of the fifth determination in Step 822 being NO, based on the second user-defined scaling policy, and for a better end-to-end data stream processing pipeline management, the orchestrator automatically reacts and increases a quantity of task managers executing on the stream processing system to reduce the RUV of the resource (e.g., to perform load balancing across the stream processing system). For example, when GPU utilization of a specific task manager reaches a certain level, the orchestrator may keep adding (in conjunction with a corresponding job manager) new task managers until the GPU utilization falls behind the first threshold. Thereafter, the method returns to Step 800 (of FIG. 8.1) in order to continuously monitor the end-to-end data stream processing pipeline, analyze the metrics, and react accordingly.

In Step 826, as a result of the fifth determination in Step 822 being YES, based on the second user-defined scaling policy, and for a better end-to-end data stream processing pipeline management, the orchestrator automatically reacts and decreases a quantity of task managers executing on the stream processing system to support/accommodate a reduced data stream ingestion or to support a reduced RUV of the resource. For example, at t7, the orchestrator scales down the quantity of task managers (e.g., 4→2), in parallel to the change in the number of stream segments. Thereafter, the method returns to Step 800 (of FIG. 8.1) in order to continuously monitor the end-to-end data stream processing pipeline, analyze the metrics, and react accordingly.

Turning now to FIG. 9, FIG. 9 shows a diagram of a computing device in accordance with one or more embodiments of the invention.

In one or more embodiments of the invention, the computing device (900) may include one or more computer processors (902), non-persistent storage (904) (e.g., volatile memory, such as RAM, cache memory), persistent storage (906) (e.g., a non-transitory computer readable medium, a hard disk, an optical drive such as a CD drive or a DVD drive, a Flash memory, etc.), a communication interface (912) (e.g., Bluetooth interface, infrared interface, network interface, optical interface, etc.), an input device(s) (910), an output device(s) (908), and numerous other elements (not shown) and functionalities. Each of these components is described below.

In one or more embodiments, the computer processor(s) (902) may be an integrated circuit for processing instructions. For example, the computer processor(s) (902) may be one or more cores or micro-cores of a processor. The computing device (900) may also include one or more input devices (910), such as a touchscreen, keyboard, mouse, microphone, touchpad, electronic pen, or any other type of input device. Further, the communication interface (912) may include an integrated circuit for connecting the computing device (900) to a network (e.g., a LAN, a WAN, Internet, mobile network, etc.) and/or to another device, such as another computing device.

In one or more embodiments, the computing device (900) may include one or more output devices (908), such as a screen (e.g., a liquid crystal display (LCD), plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (902), non-persistent storage (904), and persistent storage (906). Many different types of computing devices exist, and the aforementioned input and output device(s) may take other forms.

The problems discussed throughout this application should be understood as being examples of problems solved by embodiments described herein, and the various embodiments should not be limited to solving the same/similar problems. The disclosed embodiments are broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While embodiments discussed herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for managing a data stream processing pipeline, the method comprising:

monitoring, by an auto-scaling orchestrator, data stream ingestion of a streaming storage system (SSS) to obtain data stream metrics;

analyzing, by the auto-scaling orchestrator, the data stream metrics based on a user-defined scaling policy, by:

employing a set of machine learning (ML) models to obtain information about a plurality of task managers and an elasticity of the data stream, wherein the information is used to increase a performance of a stream processing system (SPS);

making, based on the analyzing and by the auto-scaling orchestrator, a first determination that task manager scaling is required, wherein the SPS comprises the plurality of task managers, wherein the SSS and the SPS communicate over a network and form the data stream processing pipeline;

in response to the first determination and by the auto-scaling orchestrator, making a second determination that the data stream ingestion is increased, wherein the second determination indicates an increase in a number of parallel stream segments associated with the data stream, wherein a segment store hosted by the SSS manages the parallel stream segments; and in response to the second determination and to increase the SPS' compute capability, initiating, by the auto-scaling orchestrator, scaling of a number of the plurality of task managers to support the increase in the number of the parallel stream segments, wherein the scaling comprises:

splitting at least one parallel stream segment of the parallel stream segments into a subset of the at least one parallel stream segment;

notifying, via a stream protocol, a reader component of a client that the at least one parallel stream segment has been split to enable reader parallelism; and increasing, based on the notifying and the user-defined scaling policy, a number of the plurality of task managers, wherein the increasing corresponds to the subset of the at least one parallel stream segment.

2. The method of claim 1, wherein the data stream metrics specify at least one selected from a group consisting of a number of elastic data streams, the number of the parallel stream segments, a type of data that is part of the data stream, a number of each type of the data, a size of each type of the data, a cost of executing the parallel stream segments, a type of an operating system used by the SSS, and a resource utilization value of a resource associated with the segment store.

3. The method of claim 2, wherein the resource is a central processing unit (CPU), a graphics processing unit (GPU), a data processing unit (DPU), memory, a network resource, storage space, or storage input/output (I/O).

4. The method of claim 1, wherein the user-defined scaling policy specifies a one-to-one relationship between the number of the parallel stream segments and the number of the plurality of task managers, wherein a task manager of the plurality of task managers provides a computer-implemented service to a user by processing at least a portion of the data stream ingested by the SSS.

5. The method of claim 4, wherein the data stream is a continuous, unbounded, append-only, and durable sequence of bytes, and wherein a controller of the SSS manages the data stream.

6. The method of claim 5, wherein the SSS comprises a durable log, wherein the durable log is a distributed write-ahead log providing short-term, durable, and low-latency data protection of the portion of the data stream.

7. The method of claim 6, wherein the SSS stores the portion of the data stream to a long-term storage, wherein the long-term storage is a pluggable object storage providing long-term and durable data protection of the portion of the data stream.

8. The method of claim 1, wherein the data stream metrics are analyzed by applying a reactive auto-scaling model or a proactive auto-scaling model to the data stream processing pipeline.

9. The method of claim 1, wherein the user-defined scaling policy specifies generation of an additional task manager in the SPS when a number of events per second written in a stream segment managed by the segment store exceeds a predetermined threshold value.

* * * * *